United States Patent
Sato et al.

(10) Patent No.: US 9,083,933 B2
(45) Date of Patent: Jul. 14, 2015

(54) INFORMATION PROCESSING APPARATUS, MOVING PICTURE ABSTRACT METHOD, AND COMPUTER READABLE MEDIUM

(75) Inventors: Koji Sato, Tokyo (JP); Masatomo Kurata, Tokyo (JP); Makoto Murata, Tokyo (JP); Naoki Shibuya, Kanagawa (JP)

(73) Assignee: SONY CORPORATION, Tokyo (JP)

(*) Notice: Subject to any disclaimer, the term of this patent is extended or adjusted under 35 U.S.C. 154(b) by 21 days.

(21) Appl. No.: 13/527,637

(22) Filed: Jun. 20, 2012

(65) Prior Publication Data

US 2013/0028571 A1    Jan. 31, 2013

(30) Foreign Application Priority Data

Jul. 26, 2011  (JP) .................................. 2011-163044

(51) Int. Cl.
*H04N 5/76* (2006.01)
*G11B 27/10* (2006.01)
*G11B 27/28* (2006.01)

(52) U.S. Cl.
CPC ............ *H04N 5/76* (2013.01); *G11B 27/105* (2013.01); *G11B 27/28* (2013.01)

(58) Field of Classification Search
CPC .. G11B 27/105; G11B 27/028; G11B 27/034; H04N 5/85
USPC ........................................ 386/239–242, 248
See application file for complete search history.

(56) References Cited

U.S. PATENT DOCUMENTS

| | | | |
|---|---|---|---|
| 8,276,093 B2* | 9/2012 | Matsushima et al. | 715/784 |
| 8,346,014 B2* | 1/2013 | Kurata et al. | 382/284 |
| 2002/0024999 A1* | 2/2002 | Yamaguchi et al. | 375/240.03 |
| 2002/0047892 A1* | 4/2002 | Gonsalves, Jr. | 348/14.06 |
| 2002/0083473 A1* | 6/2002 | Agnihotri et al. | 725/140 |
| 2005/0180730 A1* | 8/2005 | Huh et al. | 386/52 |
| 2006/0277454 A1* | 12/2006 | Chen | 715/500.1 |
| 2008/0292279 A1* | 11/2008 | Kamada et al. | 386/124 |
| 2008/0310725 A1* | 12/2008 | Kurata et al. | 382/190 |
| 2009/0024963 A1* | 1/2009 | Lindley et al. | 715/839 |
| 2009/0141019 A1* | 6/2009 | Lobko et al. | 345/419 |
| 2009/0169168 A1* | 7/2009 | Ishikawa | 386/52 |
| 2010/0104256 A1* | 4/2010 | Tsurumi | 386/69 |

FOREIGN PATENT DOCUMENTS

JP    2010-277661    12/2010

* cited by examiner

*Primary Examiner* — Gelek W Topgyal
(74) *Attorney, Agent, or Firm* — Hazuki International, LLC

(57) ABSTRACT

An image processing device, and associated method and computer program product, includes a user interface control unit that causes respective appearance materials in an image portfolio to be displayed on a display. Respective appearance materials are displayed in a spatial relationship. The user interface display control unit changes respective relationship values between the respective appearance materials in response to a change in the spatial relationship received as input to the user interface display control unit.

17 Claims, 31 Drawing Sheets

- AREA METADATA: POSITION (AREA) OF CHARACTER, MATERIAL, ETC. APPEARING IN MOVING PICTURE FRAME
- SECTION METADATA: SECTION IN WHICH CHARACTER, MATERIAL, ETC. APPEARS
- OBJECT METADATA: RELATED INFORMATION ON APPEARING CHARACTER, MATERIAL, ETC.

FIG. 8

|  | CHARACTER A | CHARACTER B | CHARACTER C |
|---|---|---|---|
| CHARACTER A |  | RELATIONSHIP VALUE OF CHARACTERS A AND B | RELATIONSHIP VALUE OF CHARACTERS A AND C |
| CHARACTER B | RELATIONSHIP VALUE OF CHARACTERS A AND B |  | RELATIONSHIP VALUE OF CHARACTERS B AND C |
| CHARACTER C | RELATIONSHIP VALUE OF CHARACTERS A AND C | RELATIONSHIP VALUE OF CHARACTERS B AND C |  |

FIG. 9

(JOINT APPEARANCE RELATIONSHIP)

- MOVING PICTURE $M_1$: A, B, C
- MOVING PICTURE $M_2$: A, C
- MOVING PICTURE $M_3$: B
- MOVING PICTURE $M_4$: A
- MOVING PICTURE $M_5$: A, B
- MOVING PICTURE $M_6$: A, B

(CALCULATION RESULT OF RELATIONSHIP VALUE: NUMBER OF JOINT APPEARANCE WORKS)

|  | CHARACTER A | CHARACTER B | CHARACTER C |
|---|---|---|---|
| CHARACTER A | (5) | 3 | 2 |
| CHARACTER B | 3 | (4) | 1 |
| CHARACTER C | 2 | 1 | (2) |

FIG. 10

(JOINT APPEARANCE RELATIONSHIP)

- MOVING PICTURE $M_1$: A(MAIN CHARACTER), B(MAIN CHARACTER), C(SIDE CHARACTER)
- MOVING PICTURE $M_2$: A(MAIN CHARACTER), C(MAIN CHARACTER)
- MOVING PICTURE $M_3$: B(MAIN CHARACTER)
- MOVING PICTURE $M_4$: A(SIDE CHARACTER)
- MOVING PICTURE $M_5$: A(SIDE CHARACTER), B(SIDE CHARACTER)
- MOVING PICTURE $M_6$: A(MAIN CHARACTER), B(SIDE CHARACTER)

- MOVING PICTURE OF X(MAIN CHARACTER) & Y(MAIN CHARACTER) → SCORE = 4
- MOVING PICTURE OF X(MAIN CHARACTER) & Y(SIDE CHARACTER) → SCORE = 2
- MOVING PICTURE OF X(SIDE CHARACTER) & Y(SIDE CHARACTER) → SCORE = 1

(CALCULATION RESULT OF RELATIONSHIP VALUE: TOTAL VALUE OF SCORES)

|  | CHARACTER A | CHARACTER B | CHARACTER C |
|---|---|---|---|
| CHARACTER A | (14) | 7 | 6 |
| CHARACTER B | 7 | (10) | 2 |
| CHARACTER C | 6 | 2 | (5) |

FIG. 11

$$\begin{pmatrix} \text{JOINT APPEARANCE RELATIONSHIP:} \\ \text{APPEARANCE TIME IN BRACKETS} \end{pmatrix}$$

- MOVING PICTURE $M_1$: A(40), B(30), C(10)
- MOVING PICTURE $M_2$: A(30), C(40)
- MOVING PICTURE $M_3$: B(20)
- MOVING PICTURE $M_4$: A(10)
- MOVING PICTURE $M_5$: A(5), B(10)
- MOVING PICTURE $M_6$: A(40), B(5)

⇓ · MOVING PICTURE OF $X(t_1)$ & $Y(t_2)$ → SCORE = $t_1 \times t_2$ $$\begin{pmatrix} \text{CALCULATION RESULT OF RELATIONSHIP VALUE:} \\ \text{TOTAL VALUE OF SCORES} \end{pmatrix}$$

|             | CHARACTER A | CHARACTER B | CHARACTER C |
|-------------|-------------|-------------|-------------|
| CHARACTER A | (2665)      | 1450        | 1600        |
| CHARACTER B | 1450        | (1425)      | 300         |
| CHARACTER C | 1600        | 300         | (1700)      |

FIG. 12

$\begin{pmatrix} \text{JOINT APPEARANCE RELATIONSHIP:} \\ \text{JOINT APPEARANCE SCENE TIME OF X, Y IS REPRESENTED BY [X, Y]} \end{pmatrix}$

- MOVING PICTURE $M_1$: [A,A] = 40, [B,B] = 30, [C,C] = 10, [A,B] = 20, [A,C] = 5, [B,C] = 5
- MOVING PICTURE $M_2$: [A,A] = 30, [C,C] = 40, [A,C] = 20
- MOVING PICTURE $M_3$: [B,B] = 20
- MOVING PICTURE $M_4$: [A,A] = 10
- MOVING PICTURE $M_5$: [A,A] = 5, [B,B] = 10, [A,B] = 5
- MOVING PICTURE $M_6$: [A,A] = 40, [B,B] = 5, [A,B] = 5

$\begin{pmatrix} \text{CALCULATION RESULT OF RELATIONSHIP VALUE:} \\ \text{TOTAL VALUE OF JOINT APPEARANCE SCENE TIMES} \end{pmatrix}$

|  | CHARACTER A | CHARACTER B | CHARACTER C |
|---|---|---|---|
| CHARACTER A | (125) | 30 | 25 |
| CHARACTER B | 30 | (45) | 5 |
| CHARACTER C | 25 | 5 | 50 |

FIG. 13

|  | CHARACTER A | CHARACTER B | CHARACTER C | CHARACTER D |
|---|---|---|---|---|
| CHARACTER A | ONESELF (1.0) | FAMILY (0.9) | FRIEND (0.8) | STRANGER (0.2) |
| CHARACTER B | FAMILY (0.9) | ONESELF (1.0) | STRANGER (0.1) | LOVER (0.9) |
| CHARACTER C | ENEMY (0.0) | STRANGER (0.2) | ONESELF (1.0) | FAMILY (0.9) |
| CHARACTER D | ENEMY (0.0) | FRIEND (0.7) | FAMILY (0.9) | ONESELF (1.0) |

FIG. 30

RELATIONSHIP MATRIX (BEFORE EDITING)

|  | CHARACTER A | CHARACTER B | CHARACTER C | CHARACTER D |
|---|---|---|---|---|
| CHARACTER A | 1.0 | 0.8 | 0.2 | 0.5 |
| CHARACTER B | 0.8 | 1.0 | 0.1 | 0.0 |
| CHARACTER C | 0.2 | 0.1 | 1.0 | 0.1 |
| CHARACTER D | 0.5 | 0.0 | 0.1 | 1.0 |

RELATIONSHIP MATRIX (AFTER EDITING)

|  | CHARACTER A | CHARACTER B | CHARACTER C | CHARACTER D |
|---|---|---|---|---|
| CHARACTER A | 1.0 | 0.1 | 0.7 | 0.5 |
| CHARACTER B | 0.1 | 1.0 | 0.1 | 0.0 |
| CHARACTER C | 0.7 | 0.3 | 1.0 | 0.1 |
| CHARACTER D | 0.5 | 0.0 | 0.3 | 1.0 |

□ DYNAMIC CHANGE OF ABSTRACT RESULT
→ CHANGE DIGEST CONFIGURATION
→ EMPHASIZED APPEARANCE CHARACTER IS CHANGED FROM CHARACTER B TO CHARACTER C

INFORMATION PROCESSING APPARATUS, MOVING PICTURE ABSTRACT METHOD, AND COMPUTER READABLE MEDIUM

BACKGROUND

The present disclosure relates to an information processing apparatus, a moving picture abstract method, and a computer readable medium.

Many opportunities are available to enjoy various motion pictures such as a television movie and a video movie. Also, a development of a wide area communication network advances, and in many households, it is also possible to appreciate the motion pictures distributed through streaming via the internet (hereinafter, which will be referred to as streaming movie). When a user views the above-mentioned motion pictures, the user operates a remote controller to select a broadcasting station or start playing of a video movie. In a case where the motion pictures to be viewed are a recorded movie, a DVD video movie, a Blu-ray video movie, a streaming movie, and the like, the user can specify a start point of the play and skip a part of movie scenes. For example, Japanese Unexamined Patent Application Publication No. 2010-277661 discloses a technology for carrying out a playing while commercial messages are skipped through a simple operation.

SUMMARY

However, a technology is not proposed for enabling an automatic play of a digest movie obtained by collecting movie scenes where characters appear who are related to a character specified among characters appearing in a moving picture or for carrying out a display to allow a viewer to grasp an outline of these movie scenes in an overview manner. The present technology is devised in view of the above-mentioned circumstances and intended to provide a novel and improved information processing apparatus, a moving picture abstract method, and a program with which it is possible to realize a selection method for a scene group by taking into account a relationship between appearance characters while a selected appearance character is set as a reference and a mechanism of selectively playing the scene group. Also, the present technology is also intended to realize a selection method for the scene group by further taking account a relationship between articles appearing in the moving picture or between the article and the character.

According to the above teachings, an apparatus embodiment of an image processing device according to the present disclosure includes
a user interface display control unit that causes respective appearance materials in an image portfolio to be displayed on a display, the respective appearance materials being displayed in a spatial relationship, the user interface display control unit configured to change respective relationship values between the respective appearance materials in response to a change in the spatial relationship received as input to the user interface display control unit.

According to one aspect of the embodiment the device further includes
the display.

According to another aspect of the embodiment,
the display being an interactive display that is at least one of a touch screen display and a proximity display.

According to another aspect of the embodiment,
the display displays a scene from the image portfolio; and in response to the change in spatial relationship received as input, the user interface display control unit changes the scene to another scene.

According to another aspect of the embodiment,
the image portfolio includes photographs.

According to another aspect of the embodiment,
the image portfolio includes video frames.

According to another aspect of the embodiment, the device further includes
an input device; and
a communication unit, wherein
the display is remotely located from the image processing device and the communication unit generates a control signal sent wirelessly via the communication unit to a remote device that controls content that is displayed on the display.

According to another aspect of the embodiment, the device further includes
a housing that includes the user interface control unit, the input device, and the communication unit, wherein
the housing being a housing for one of a tablet computer and a remote controller.

According to another aspect of the embodiment,
the spatial relationship data and the appearance materials are simultaneously displayed on the display.

According to another aspect of the embodiment, the device further includes
a relationship information generation unit that calculates relationship values between the respective appearance materials and a particular appearance material and selects a predetermined number of appearance materials in descending relationship value order.

According to another aspect of the embodiment, the device further includes
a relationship information generation unit that calculates relationship values between pairs of appearance materials and orders the pairs of appearance materials in descending relationship value order.

According to another aspect of the embodiment, the device further includes
a relationship information generation unit that calculates relationship values between all appearance materials occurring in respective video scenes and orders appearance materials in descending relationship value order.

According to another aspect of the embodiment, the device further includes
a relationship information generation unit that calculates relationship values between a predetermined appearance material and all detected appearance materials in respective video scenes and orders appearance materials in descending relationship value order.

According to an image processing method embodiment, the method includes
displaying with a user interface display control unit respective appearance materials in an image portfolio, the displaying including
  displaying on a display respective appearance materials in a spatial relationship,
  receiving a change in the spatial relationship input to the user interface display control unit; and
  changing respective relationship values between the respective appearance materials in response to the receiving.

According to an aspect of the embodiment,
the displaying includes displaying a scene from the image portfolio; and
in response to the changing in spatial relationship received as input, changing to another displayed scene.

According to another aspect of the embodiment, the method further includes calculating with a relationship information generation unit relationship values between the respective appearance materials and a particular appearance material; and selecting a predetermined number of appearance materials in descending relationship value order.

According to another aspect of the embodiment, the method further includes calculating relationship values between pairs of appearance materials and ordering predetermined pairs of appearance materials in descending relationship value order.

According to another aspect of the embodiment, the method further includes calculating relationship values between all appearance materials occurring in respective scenes; and ordering appearance materials in descending relationship value order.

According to another aspect of the embodiment, the method further includes calculating relationship values between a predetermined appearance material and all detected appearance materials in a scene; and ordering appearance materials in descending relationship value order.

According to a non-transitory computer storage medium embodiment, the storage medium includes computer readable instructions that when executed by a processing circuit performs an image processing method that includes displaying with a user interface display control unit respective appearance materials in an image portfolio, the displaying including displaying on a display respective appearance materials in a spatial relationship, receiving a change in the spatial relationship input to the user interface display control unit; and changing respective relationship values between the respective appearance materials in response to the receiving.

BRIEF DESCRIPTION OF THE DRAWINGS

FIG. 8 is an explanatory diagram for describing the calculation method for the relationship value;

FIG. 9 is an explanatory diagram for describing the calculation method for the relationship value;

FIG. 10 is an explanatory diagram for describing the calculation method for the relationship value;

FIG. 11 is an explanatory diagram for describing the calculation method for the relationship value;

FIG. 12 is an explanatory diagram for describing the calculation method for the relationship value;

FIG. 13 is an explanatory diagram for describing relationship information;

FIG. 30 is an explanatory diagram for describing the editing method for the relationship value according to the present embodiment;

DETAILED DESCRIPTION OF EMBODIMENTS

Figure 1:
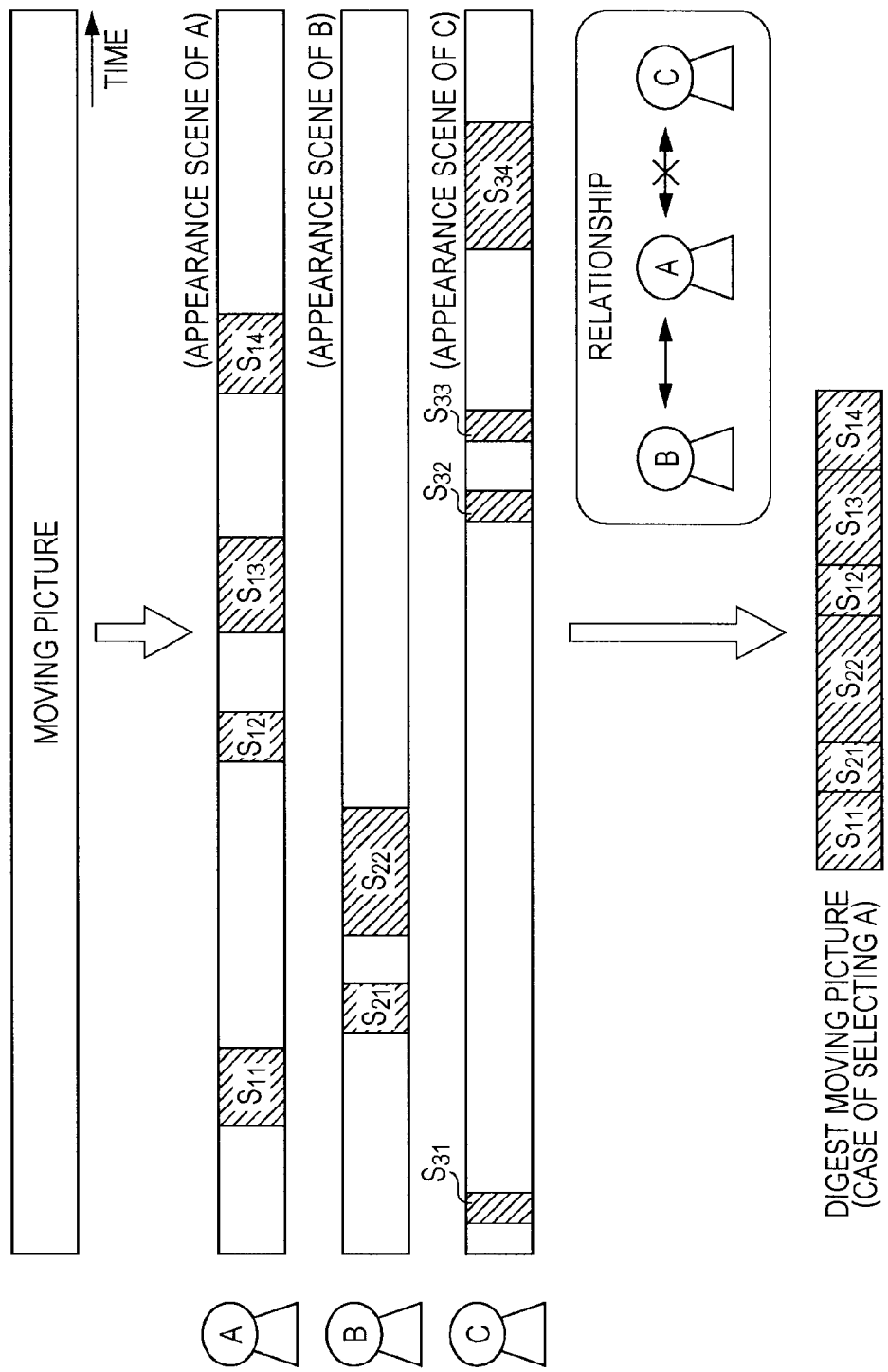
FIG. 1 is an explanatory diagram for describing an outline of a moving picture abstract technique.

Hereinafter, with reference to the accompanying drawings, embodiments related to the present technology will be described in detail. It should be noted that in the present specification and the drawings, components having substantially the same function configurations are assigned with the same reference symbols, and a redundant description will be omitted.

[Regarding Flow of Description]

Here, a flow of a description described below will be simply explained.

First, while referring to FIGS. 1 to 4, an outline of a moving picture abstract technique according to the present embodiment will be described. Subsequently, while referring to FIGS. 5 to 13, a calculation method for a relationship value will be described. Subsequently, while referring to FIGS. 14 to 16, a configuration example of an information processing apparatus 100 according to the present embodiment will be described. Subsequently, while referring to FIGS. 17 to 27, an operation example of the information processing apparatus 100 according to the present embodiment will be described.

Subsequently, while referring to FIGS. 28 to 30, an editing method for the relationship value according to the present embodiment will be described. Subsequently, while referring to FIGS. 31 to 33, a moving picture abstract technique according to a modified example of the present embodiment will be described. Subsequently, while referring to FIG. 34, a hardware configuration example with which a function of the information processing apparatus 100 according to the present embodiment can be realized will be described. It should be noted that FIG. 35 will be appropriately referred to during the explanation.

Lastly, a technical idea of the same embodiment will be summarized, and actions and effects obtained from the relevant technical idea will be simply described.

(Description Paragraphs)
1: Introduction
   1-1: Outline of moving picture abstract technique based on relationship between appearance characters
      1-1-1: Regarding digest play
      1-1-2: Regarding comics display
   1-2: Calculation method for relationship value
      1-2-1: Regarding moving picture time-line metadata
      1-2-2: Evaluation method for joint appearance relationship based on section metadata
      1-2-3: Calculation method for relationship value based on number of joint appearance works
      1-2-4: Calculation method for relationship value based on number of joint appearance works (weighted)
      1-2-5: Calculation method for relationship value based on appearance time
      1-2-6: Calculation method for relationship value based on appearance scene time
   1-3: Expansion of relationship information
2: Embodiments
   2-1: Configuration of information processing apparatus 100
      2-1-1: Standard configuration
      2-1-2: Modified example #1 (configuration of automatically generating metadata from moving picture)
      2-1-3: Modified example #2 (configuration of utilizing predetermined relationship information)
   2-2: Operation of information processing apparatus 100
      2-2-1: Basic operation
      2-2-2: Abstract process #1 (method of maximizing total sum of relationship values
      2-2-3: Abstract process #2 (maximization (1) of relationship value sum at time of scene switching)
      2-2-4: Abstract process #3 (maximization (2) of relationship value sum at time of scene switching)
      2-2-5: Abstract process #4 (minimization of relationship value sum at time of scene switching)
      2-2-6: Abstract process #5 (other configuration)
   2-3: Editing method for relationship value
      2-3-1: Configuration of operation UI
      2-3-2: Operation of information processing apparatus 100 accompanies by editing process for relationship value
   2-4: Modified example (moving picture abstract technique utilizing template)
      2-4-1: Configuration of template
      2-4-2: Flow of abstract process
      2-4-3: Template automatic generation method
3: Hardware configuration example
4: Closing

1: INTRODUCTION

First, before the moving picture abstract technique according to the present embodiment will be described in detail, the outline of the moving picture abstract technique and the calculation method for the relationship value used for the moving picture abstract technique will be described.

[1-1: Outline of Moving Picture Abstract Technique Based on Relationship Between Appearance Characters]

Figure 2:
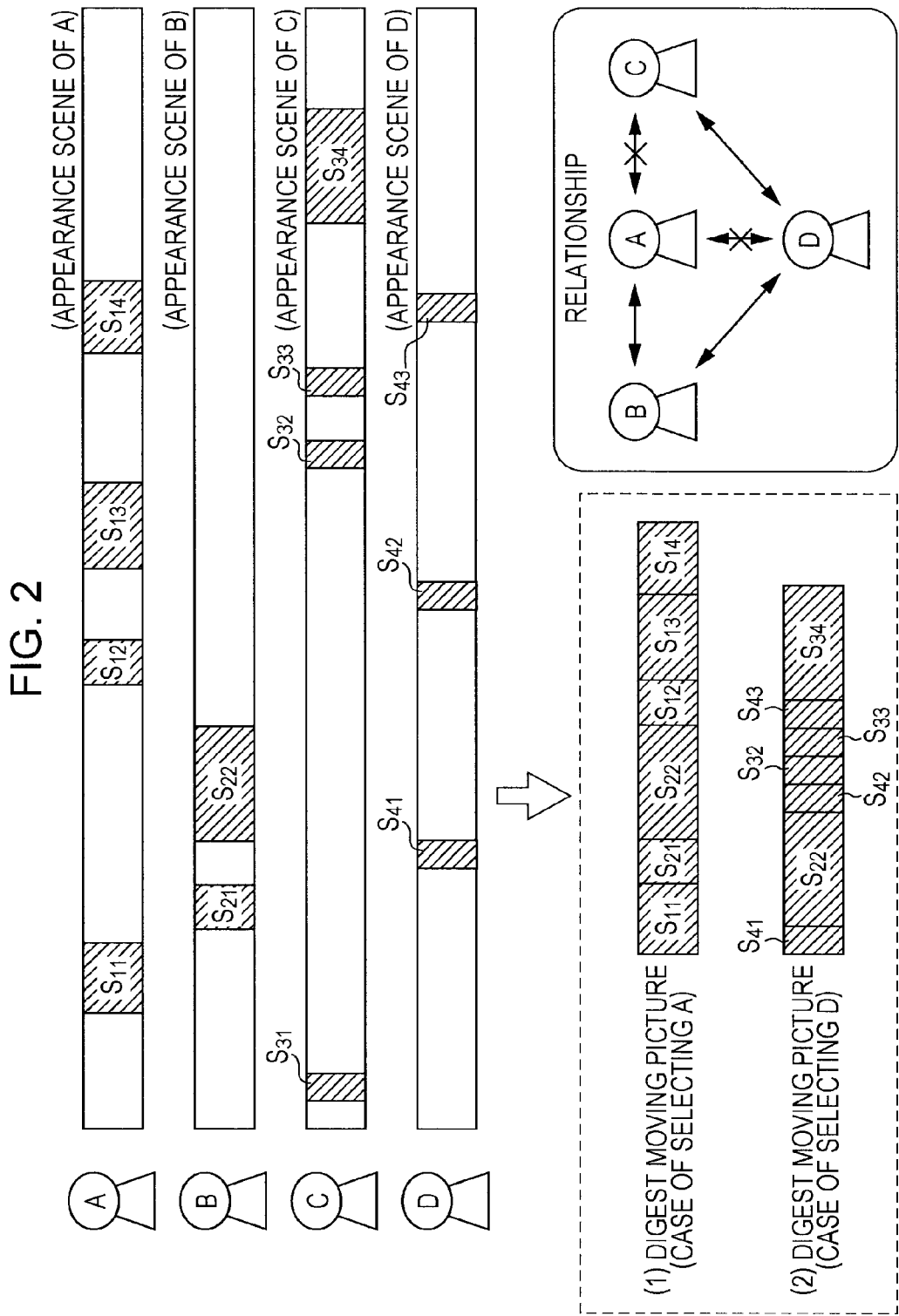
FIG. 2 is an explanatory diagram for describing the outline of the moving picture abstract technique.
Figure 3:
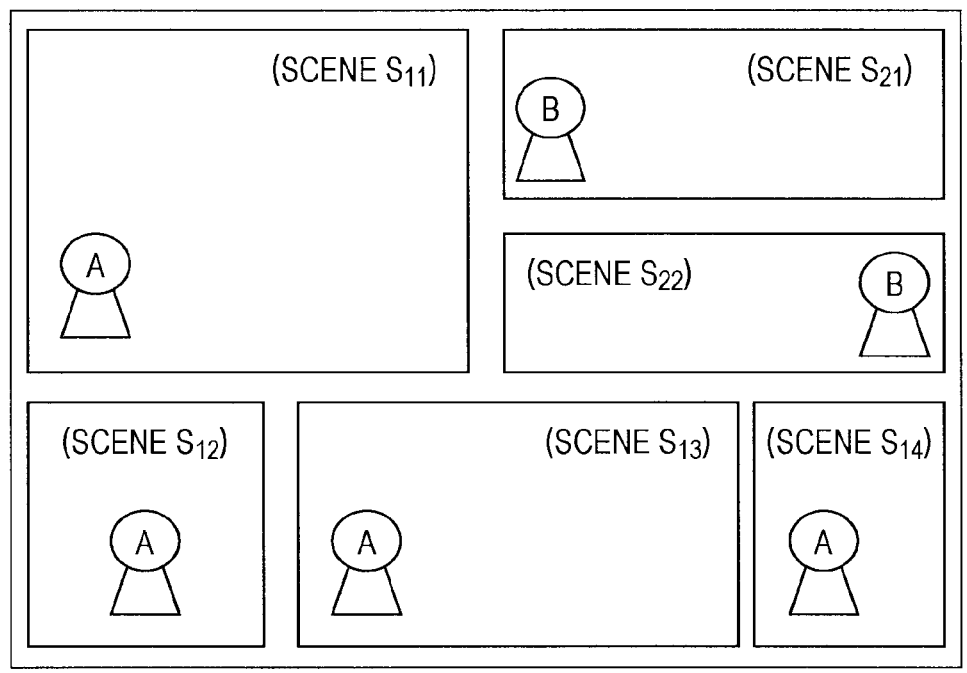
FIG. 3 is an explanatory diagram for describing the outline of the moving picture abstract technique.
Figure 4:
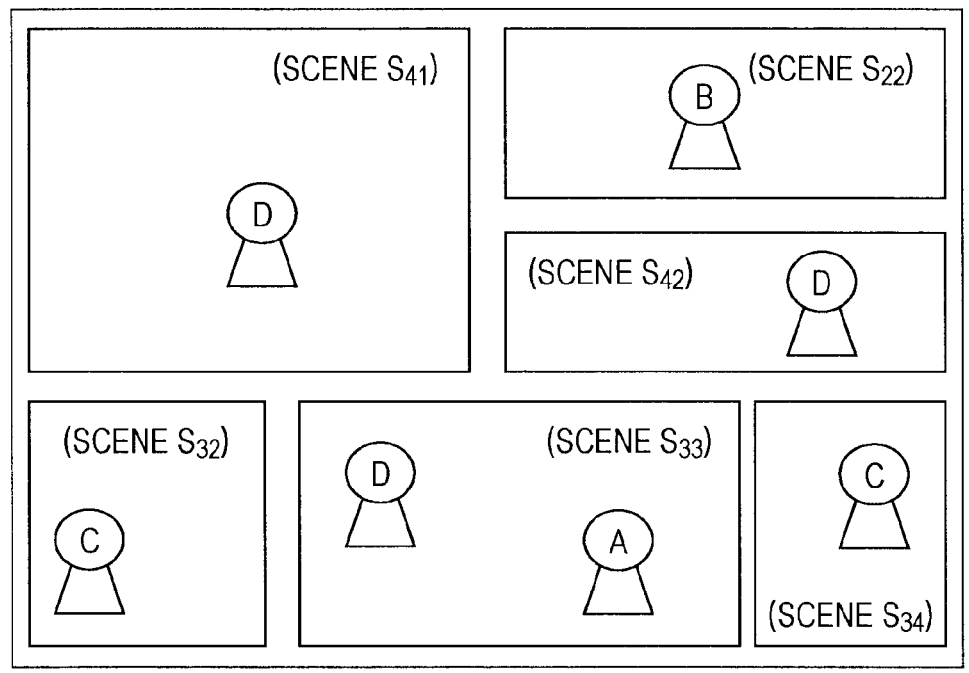
FIG. 4 is an explanatory diagram for describing the outline of the moving picture abstract technique.

First, while referring to FIGS. 1 to 4, an outline of a moving picture abstract technique based on a relationship between appearance characters will be described. FIGS. 1 and 2 are explanatory diagrams for describing a mechanism of a digest play utilizing a relationship between appearance materials. Also, FIGS. 3 and 4 are explanatory diagrams for describing a comics display method for representative scene images utilizing a relationship between appearance materials. More generally the scene images are part of an image portfolio that may include video frames that are part of a video, or photographs that are part of a set of an array of photographs.

(1-1-1: Regarding Digest Play)

In recent years, the number of opportunities to edit a moving picture is increased even in general households. For example, an editing operation for cutting out movie scenes containing its own child and characters and articles (hereinafter, which will be referred to as materials) related to its own child from a movie recording an athletic festival of children and joining the relevant scenes is carried out by a camera operator itself in many cases. However, the above-mentioned editing operation is a high-load operation for the camera operator. Also, the camera operator sometimes does not adequately understand the appearance materials related to the child, and it is difficult to obtain an actually appropriate editing result in some cases. For that reason, a technology of automatically extracting appropriate movie scenes by taking into account a relationship between the appearance materials is demanded.

If the appropriate movie scenes are automatically extracted by taking into account a relationship between the appearance materials, without actually editing the moving picture, by playing only the automatically extracted movie scenes in a time-series manner, it is possible to realize a viewing mode of the moving picture in keeping with an intention of the viewer. For example, if its own child is specified and only the appearance scenes of its own child and related appearance materials are automatically extracted and played, the same result as the playing of the edited moving picture is obtained. In addition, it becomes also possible to selectively play the appearance scenes of the appearance material related to the appearance material specified by the user while targeting not only the moving picture shot by the user but also a moving picture such as a film distributed in the market.

Hereinafter, the playing method of selectively playing the particular movie scenes from the moving picture will be referred to as digest play. The digest play of the moving picture is of course an abstract of the moving picture. Incidentally, according to the present embodiment, the digest play of the moving picture is realized by using a mechanism illustrated in FIGS. 1 and 2. For example, a character A, a character B, and a character C are set to appear in a certain moving picture. In other words, the character A, the character B, and the character C are appearance materials in this moving picture. The character A and the character B have a fine relationship. On the other hand, the character A and the character C have a hostile relationship. It should be noted that a method of quantifying a relationship between the appearance materials will be described in a later stage.

First, appearance scenes of the character A, the character B, and the character C in the moving picture are extracted. Also, the user selects the character A and desires the digest play based on the fine relationship, the character B having the fine relationship with the character A is selected. Subsequently, the appearance scene of the character A and the appearance scene of the character B are disposed in a time-series manner to generate a digest moving picture. It should be noted however that the digest moving picture may be moving picture data obtained by actually editing the moving picture or information indicating play sections. In the example of FIG. 1, a digest moving picture in which sections $S_{11}$ to $S_{14}$ where the character A appears and sections $S_{21}$ and $S_{22}$ where the character B appears are disposed in a time-series manner is obtained.

In the meantime, when the user selects a different appearance material, as illustrated in FIG. 2, the content of the digest moving picture is also changed. In the example of FIG. 2, it is assumed that the character A, the character B, the character C, and a character D appear in the moving picture. Also, the character A and the character B have a fine relationship, and the character A and the character C have a hostile relationship. Then, the character A and the character D have a hostile relationship, and the character B and the character D have a fine relationship. Furthermore, the character C and the character D have a fine relationship. In a case the above-mentioned relationships exist, when the user selects the character A and desires the digest play based on the fine relationship, the digest moving picture has a configuration illustrated in (1). In the meantime, when the user selects the character D, the digest moving picture has a configuration illustrated in (2).

As described above, when the moving picture abstract technique according to the present embodiment is used, even in the case of the moving picture, by changing the appearance material to be selected, the content of the moving picture subjected to the digest play is also changed. Also, the digest play based on the fine relationship has been considered in the above-mentioned example, but a setting of switching types of relationships in mid course may be adopted. For example, with the provision of a setting "friendly relationship→hostile relationship→no relationship→hostile relationship→friendly relationship", it is possible to provide a particular storyline to the digest moving picture. It should be noted however that even in a case where the setting related to the above-mentioned relationship is adopted, the content of the digest moving picture is still changed while following the change of the appearance material selected by the user.

(1-1-2: Regarding Comics Display)

The digest play illustrated in FIGS. 1 and 2 is related to the method utilized for viewing the abstracted moving picture in a time-series manner. On the other hand, a comics display described herein is related to a method utilized for viewing an abstract result of the moving picture in an overview manner. It should be noted however that an extraction method for the movie scene is the same as extraction method for the movie scene in the above-mentioned digest play. For example, in a case where the character A is selected in the example of FIG. 2, the sections $S_{11}$ to $S_{14}$ where the character A appears and the sections $S_{21}$ and $S_{22}$ where the character B appears are extracted. However, in the case of the comics display, the sections $S_{11}$ to $S_{14}$, $S_{21}$, and $S_{22}$ are not played in a time-series manner, and as illustrated in FIG. 3, images representing the respective sections are disposed and displayed. It should be noted that the moving pictures in the respective sections may be configured to be played instead of the representative images.

In the meantime, in a case where the character D is selected in the example of FIG. 2, sections $S_{41}$ to $S_{43}$ where the character D appears, the section $S_{22}$ where the character B appears after the appearance scene of the character D, and the sections $S_{32}$ to $S_{34}$ where the character C appears after the appearance scene of the character D are extracted. In this case, as illustrated in FIG. 4, the images representing the respective sections are disposed and displayed. It should be noted that one frame and one section may not correspond on a one-to-one basis. For example, the images displayed in the respective frames may be switched to images corresponding to the other sections for every predetermined time. Also, in a case where the user makes a selection from the images of the respective frames, the moving picture of the section corresponding to the selected image may be played. Furthermore, the frame corresponding to the appearance scene of the appearance material having a strong relationship with the appearance material selected by the user may be configured to be highlighted.

As described above, when the moving picture abstract technique according to the present embodiment is used, it is possible to carry out the digest play and the comics display described above. It should be noted that the expression method for the abstract result are not limited to these method.

[1-2: Calculation Method for Relationship Value]

Next, while referring to FIGS. 5 to 12, a calculation method for a relationship value will be described. This relationship value quantitatively represents a relationship between the appearance materials. This relationship value is calculated, for example, by utilizing moving picture time-line metadata described below.

(1-2-1: Regarding Moving Picture Time-Line Metadata)

Figure 5:
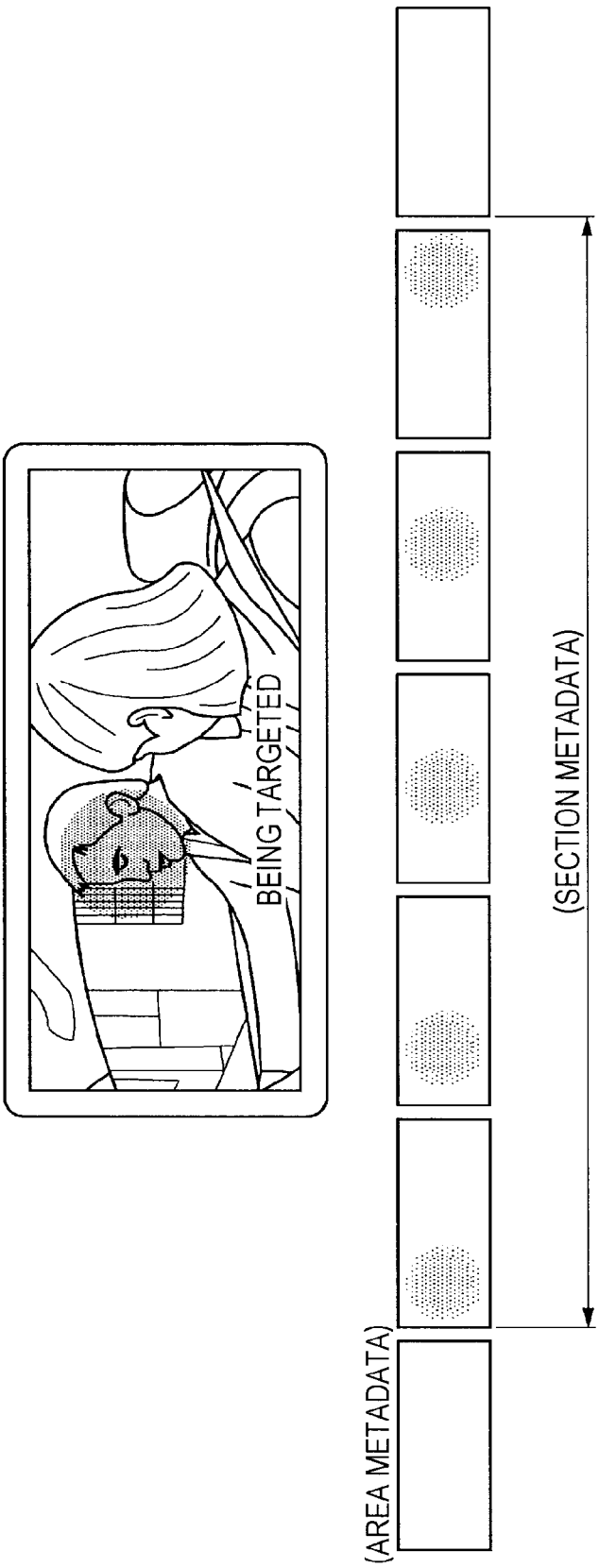
FIG. 5 is an explanatory diagram for describing a calculation method for a relationship value.

First, the moving picture time-line metadata will be described. As illustrated in FIG. 5, the moving picture time-line metadata is composed of area metadata, section metadata, and object metadata. The area metadata is metadata indicating a position and a range of a character, an article, and the like (appearance material) appearing in the moving picture frame. In the example of FIG. 5, the area metadata indicating a face area of a character appearing in the moving picture frame is exemplified. Also, the section metadata is metadata indicating a section where the appearance material appears in the moving picture. Then, the object metadata is metadata indicating related information related to the appearance material appearing in the moving picture.

It should be noted that the moving picture time-line metadata is set for each appearance material appearing in the moving picture. Also, the moving picture time-line metadata is set for each of the moving pictures. For that reason, among pieces of the moving picture time-line metadata, by utilizing the section metadata, it is possible to find out which appearance material appears in which section in which moving picture. Also, by utilizing the area metadata, it is possible to find out a correspondence relationship between an area on a screen specified by the user and the appearance material displayed on the screen. For example, when the area metadata and the object metadata are utilized, in a case where the user specifies the face area of the appearance character, it is possible to realize a user interface in which the related information related to the appearance character is displayed.

Figure 35:
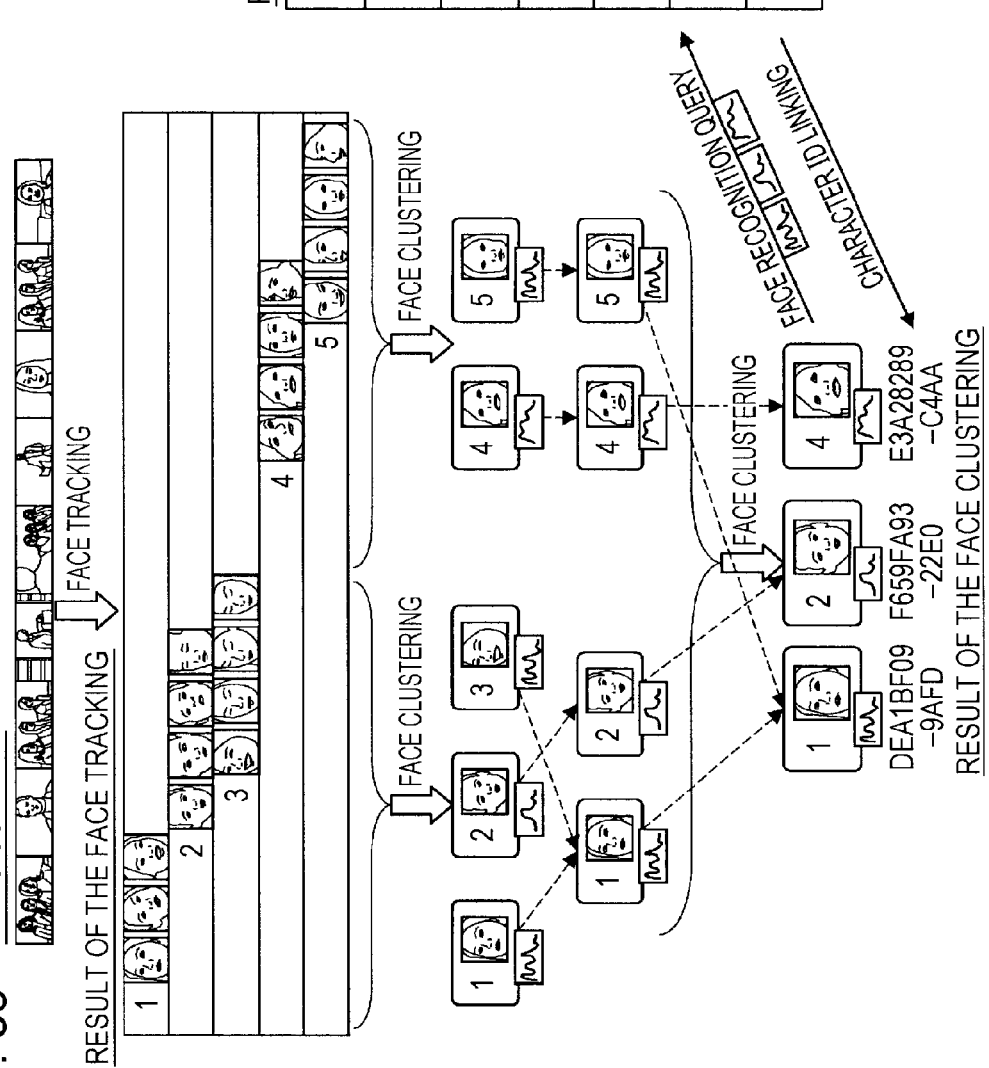
FIG. 35 is a reference drawing illustrating contents of a face tracking, a face clustering, and a face recognition.

It should be also noted that the moving picture time-line metadata may be generated by a manual input but can automatically generated by using a method such as a face detection, a face tracking, a face clustering, a face recognition illustrated in FIG. 35. Also, by combining the generation method based on the manual input and the automatic generation method with each other, it is possible to generate the high-accuracy moving picture time-line metadata. For example, it is possible to utilize technologies described in Japanese Unexamined Patent Application Publication No. 2005-44330 (material detection tracking), Japanese Unexamined Patent Application Publication No. 2010-3021 (clustering), Japanese Unexamined Patent Application Publication No. 2007-65766 (recognition), and the like.

(1-2-2: Evaluation Method for Joint Appearance Relationship Based on Section Metadata)

Figure 6:
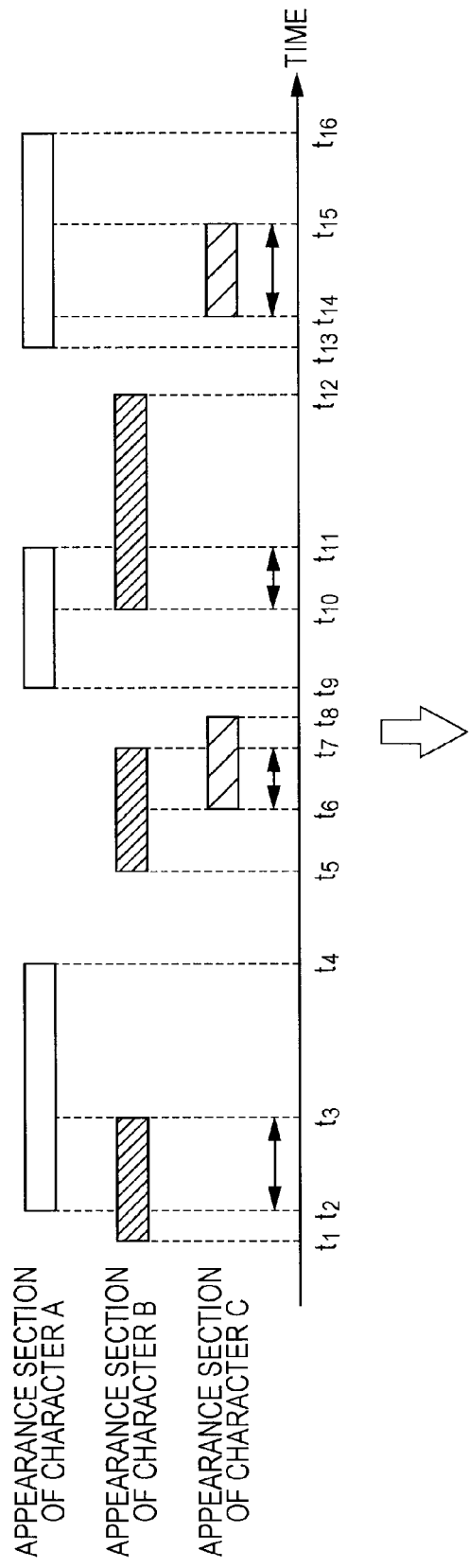
FIG. 6 is an explanatory diagram for describing the calculation method for the relationship value.
Figure 7:
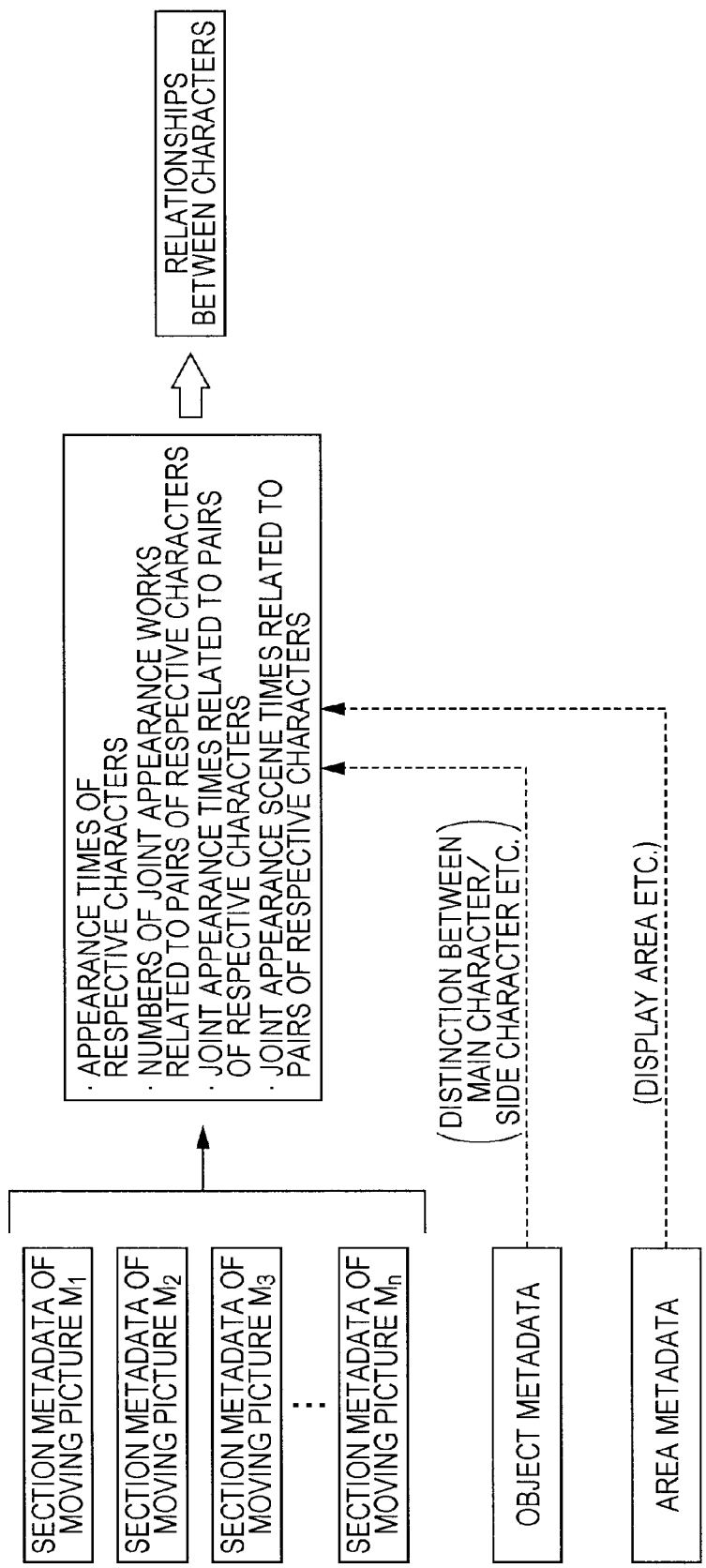
FIG. 7 is an explanatory diagram for describing the calculation method for the relationship value.

Next, while referring to FIGS. 6 to 8, an evaluation method for a joint appearance relationship based on section metadata will be described. It should be noted that the joint appearance described herein means a state in which plural appearance materials appear in the same moving picture or the same moving picture frame. Also, hereinafter, for the convenience of the description, a description will be continued while taking a case as an example in which the appearance materials are characters. First, main types of information obtained from the section metadata and an evaluation reference for evaluating a relationship between the characters will be described. FIGS. 6 to 8 are explanatory diagrams for describing an evaluation method for joint appearance relationship based on the section metadata.

First, a reference is made on FIG. 6. As described above, the section metadata is prepared for each moving picture and for each character. Also, the respective pieces of section metadata represent sections where the characters appear in the moving picture. In FIG. 6, with regard to a moving picture $M_1$, the section metadata representing the appearance sections of the character A, the section metadata representing the appearance sections of the character B, and the section metadata representing the appearance sections of the character C are exemplified. In the example of FIG. 6, a section from $t_2$ to $t_4$, a section from $t_9$ to $t_{11}$, and a section from $t_{13}$ to $t_{16}$ correspond to the appearance sections of the character A. Also, a section from $t_1$ to $t_3$, a section from $t_5$ to $t_7$, and a section from $t_{10}$ to $t_{12}$ correspond to the appearance sections of the character B. Furthermore, a section from $t_6$ to $t_8$ and a section from $t_{14}$ to $t_{15}$ correspond to the appearance sections of the character C.

From the three pieces of section metadata exemplified in FIG. 6, appearance times of the respective appearance characters in the moving picture $M_1$ (appearance time organized by each moving picture), joint appearance characters in the moving picture $M_1$, and a length of joint appearance scene in the moving picture $M_1$ (hereinafter, which will be referred to as joint appearance scene time) are found out. For example, an appearance time organized by each moving picture $\Delta t_{1A}$ of the character A in the moving picture $M_1$ is calculated as follow: $\Delta t_{1A}=|t_4-t_2|+|t_{11}-t_9|+|t_{16}-t_{13}|$. The same applies to an appearance time organized by each moving picture $\Delta t_{1B}$ of the character B and an appearance time organized by each moving picture $\Delta t_{1C}$ of the character C. Also, since the appearance sections of the characters A, B, and C exist in the moving picture $M_1$, it is found out that the character A and the character B are joint appearance characters, the character B and the character C are joint appearance characters, and the character C and the character A are joint appearance characters.

Furthermore, since the character A and the character B jointly appear in the section from $t_2$ to $t_3$ and the section from $t_{10}$ to $t_{11}$, a joint appearance scene time $\Delta t_{1AB}$ of the character A and the character B in the moving picture $M_1$ is calculated as follow: $\Delta t_{1AB}=|t_3-t_2|+|t_{11}-t_{10}|$. Similarly, since the character B and the character C jointly appear in the section from $t_6$ to $t_7$, a joint appearance scene time $\Delta t_{1BC}$ of the character B and the character C in the moving picture $M_1$ is calculated as follow: $\Delta t_{1BC}=|t_7-t_6|$. Also, since the character A and the character C jointly appear in the section from $t_{14}$ to $t_{15}$, a joint appearance scene time $\Delta t_{1CA}$ the character A and the character C in the moving picture $M_1$ is calculated as follow: $\Delta t_{1CA}=|t_{15}-t_{14}|$.

In this manner, by analyzing the section metadata of the respective moving pictures, the appearance times organized by each moving picture of the respective appearance characters in the respective moving pictures, the joint appearance characters in the respective moving pictures, and the joint appearance scene times in the respective moving pictures are obtained. Also, by combining the pieces of information on the appearance times organized by each moving picture, the joint appearance characters, the joint appearance scene times, and the like which are obtained with regard to the plural moving pictures, as illustrated in FIG. 7, pieces of information on total appearance times of the respective characters, the joint appearance works related to the pairs of the respective characters, total joint appearance times related to the pairs of the respective characters, and total joint appearance scene times related to the pairs of the respective characters with regard to the targeted moving picture group (in the example of FIG. 7, the moving pictures $M_1$ to $M_n$) are obtained.

For example, when the appearance times organized by each moving picture of the same character with respect to the targeted moving picture group are summed up, the total appearance time of the relevant character is obtained. Also, since the joint appearance characters in the respective moving pictures are found out, when the number of moving pictures where a certain set of characters are the joint characters is calculated, the number of the joint appearance works related to the relevant set of the characters is obtained. Furthermore, by paying attention to a certain set of characters and summing up the appearance times organized by each moving picture of the respective characters with regard to the moving picture group where the set of characters jointly appear, the joint appearance time related to the relevant set of characters is obtained. Also, by paying attention to a certain set of characters and summing up the joint appearance scene time with regard to the moving picture group where the set of characters jointly appear, the joint appearance scene time related to the relevant set of characters is obtained.

For example, it is set that the character D and a character E makes a joint appearance in the moving pictures $M_2$ and $M_5$. In this case, the joint appearance time related to the set of the character D and the character E corresponds to a sum ($\Delta t_{2D}+\Delta t_{5D}+\Delta t_{2E}+\Delta t_{5E}$) of a total value of appearance times organized by each moving picture of the character D ($\Delta t_{2D}$ and $\Delta t_{5D}$) in the moving pictures $M_2$ and $M_5$ and a total value of appearance times organized by each moving picture of the character E ($\Delta t_{2E}$ and $\Delta t_{5E}$) in the moving pictures $M_2$ and $M_5$. Also, the joint appearance scene time related to the set of the character D and the character E corresponds to a sum ($\Delta t_{2DE}$+ $\Delta t_{5DE}$) of the joint appearance scene time $\Delta t_{2DE}$ in the moving pictures $M_2$ and the joint appearance scene time $\Delta t_{5DE}$ in the moving pictures $M_5$.

It is conceivable that the set of characters having the large number of joint appearance works, the set of characters having the long joint appearance time, and the set of characters having the long joint appearance scene time have a strong relationship between the characters. It is also conceivable that as the number of works where each character jointly appears as the main character is increased, the relationship between the characters is stronger. Furthermore, it is considered to be suitable to carry out the evaluation on the relationship between the characters by taking into account a size of the displayed area or the like. If the display area is not taken into account, for example, a character appearing as an extra and a male actor as a main character may have a high relationship and the actor as the main character and a female actor as a main character may have a low relationship in some cases. Information on whether the character is a main character, a side character, or the like is obtained from the object metadata. Also, in a case where object data includes information on a child, an adult, a male character, a female character, an age, and the like, these pieces of information may be utilized. Also, the display area and the like are obtained from the area metadata.

As described above, various pieces of information for evaluating the relationship between the characters are obtained by utilizing the section metadata. Also, it is possible to evaluation the relationship between the characters by utilizing the information. Furthermore, it is possible to evaluation the relationship between the characters more appropriately by utilizing the object metadata and the area metadata in combination. For example, the relationship between the characters can be represented in a matrix format as illustrated in FIG. 8. It should be noted that a relationship value representing an intensity of the relationship between the pair of the characters corresponding to the relevant element is input to an individual box of the matrix. This matrix is referred to as relationship matrix. Also, the relationship matrix can be similarly obtained with regard to the appearance materials other than the characters. Hereinafter, a description will be given of a specific calculation method for the relationship value.

(1-2-3: Calculation Method for Relationship Value Based on Number of Joint Appearance Works)

First, while referring to FIG. 9, a calculation method for a relationship value based on the number of joint appearance works will be described. FIG. 9 is an explanatory diagram for describing the calculation method for the relationship value based on the number of joint appearance works. It should be noted that the targeted moving picture group is set as the moving pictures $M_1$ to $M_6$. Also, the characters appearing in the moving pictures $M_1$ to $M_6$ are set as the character A, the character B, and the character C.

As already described above, when the section metadata is utilized, as illustrated in FIG. 6, the joint appearance relationships between the character A, the character B, and the character C are obtained. In the example of FIG. 9, the appearance characters in the moving picture $M_1$ are the character A, the character B, and the character C. Also, the appearance characters in the moving picture $M_2$ are the character A and the character C. Furthermore, the appearance character in the moving picture $M_3$ is only the character B. Then, the appearance character in the moving picture $M_4$ is only the character A. Also, the appearance characters in the moving picture $M_5$ are the character A and the character B. Furthermore, the appearance characters in the moving picture $M_6$ are the character A and the character B. In other words, the works where the character A and the character B jointly appear are the moving picture $M_1$, the moving picture $M_5$, and the moving picture $M_6$. Also, the works where the character A and the character C jointly appear are the moving picture $M_1$ and the moving picture $M_2$. Furthermore, the work where the character B and the character C jointly appear is only the moving picture $M_1$.

The number of works where the character A and the character B jointly appear is 3, the number of works where the character A and the character C jointly appear is 2, and the number of works where the character B and the character C jointly appear is 1. Therefore, the relationship value representing the relationship between the character A and the character B is 3, the relationship value representing the relationship between the character A and the character C is 2, and the relationship value representing the relationship between the character B and the character C is 1. It should be noted that a relationship value between the same characters can be calculated as a matter of form. For example, a work where the character A and the character A jointly appear is synonymous with the work where the character A appears and corresponds to the moving pictures $M_1$, $M_2$, and $M_4$ to $M_6$. In other words, the number of joint appearance works between the character A and the character A is 5, and the relationship value representing the relationship between the character A and the character A is 5. The same applies to the character B and the character C.

When the relationship values calculated in the above-mentioned method also including the relationship value related to the same character are summarized, the relationship matrix illustrated in FIG. 9 is obtained. It should be noted however that a diagonal component of this relationship matrix represents the number of appearance works of the character corresponding to the individual box. It should be noted that herein, the number of appearance works is described as the relationship value as it is, but it is suitable to utilize the numeric value processed through a multiplication with a predetermined coefficient, a normalization, or the like as the relationship value. For example, it is suitable to carry out the normalization so that all the diagonal components correspond to 1.

In the above, the calculation method for the relationship value based on the number of joint appearance works has been described.

(1-2-4: Calculation Method for Relationship Value Based on Number of Joint Appearance Works (Weighted))

Next, while referring to FIG. 10, a calculation method for a relationship value based on the number of joint appearance works (weighted) will be described. FIG. 10 is an explanatory diagram for describing the calculation method for the relationship value based on the number of joint appearance works (weighted). Here, a distinction between the main character/the side character is represented by a weight, and a method of calculating a relationship value on the basis of a weight value and the number of joint appearance works will be described. It should be noted that also in a case where distinction between the child, the adult, the male character, the female character, the age, and the like are represented by weights, the relationship matrix can be obtained through a similar method. In this case, the targeted moving picture group is set as the moving pictures $M_1$ to $M_6$. Also, the characters appearing in the moving pictures $M_1$ to $M_6$ are set as the character A, the character B, and the character C.

When the section metadata is utilized, as illustrated in FIG. 10, the joint appearance relationships between the character A, the character B, and the character C are obtained. In the example of FIG. 10, the appearance characters in the moving picture $M_1$ are the character A, the character B, and the character C. Also, the appearance characters in the moving picture $M_2$ are the character A and the character C. Furthermore, the appearance character in the moving picture $M_3$ is only the character B. Then, the appearance character in the moving picture $M_4$ is only the character A. Also, the appearance characters in the moving picture $M_5$ are the character A and the character B. Furthermore, the appearance characters in the moving picture $M_6$ are the character A and the character B. In other words, the works where the character A and the character B jointly appear are the moving picture $M_1$, the moving picture $M_5$, and the moving picture $M_6$. Also, the works where the character A and the character C jointly appear are the moving picture $M_1$ and the moving picture $M_2$. Furthermore, the work where the character B and the character C jointly appear is only the moving picture $M_1$.

Also, when the object metadata is utilized, it is found out that the character A and the character B are the main characters and the character C is the side character the moving picture $M_1$. Similarly, it is found out that the character A is the main character and the character C is the side character in the moving picture $M_2$. Also, it is found out that the character B is the main character in the moving picture $M_3$. Furthermore, it is found out that the character A is the side character in the moving picture $M_4$. Then, it is found out that the character A and the character B are the side characters in the moving picture $M_5$. Also, it is found out that the character A is the main character and the character B is the side character in the moving picture $M_6$.

Herein, a consideration will be given of the weight. In a case where the joint appearance characters are both the main characters, for every joint work, a score=4 is given. In a case where one of the joint appearance characters is the main character and also the other is the side character, for every joint work, a score=2 is given. Furthermore, in a case where the joint appearance characters are both the side characters, for every joint work, a score=1 is given.

In the example of FIG. 10, the work where both the character A and the character B play a role as the main character is the moving picture $M_1$. Also, the work where the character A plays a role as the main character and the character B plays a role as the side character or the work where the character A plays a role as the side character and also the character B plays a role as the main character is the moving picture $M_6$. Then, the work where both the character A and the character B play a role as the side character is the moving picture $M_5$. From these results, with regard to the pair of the character A and the character B, the number of the work where both the character A and the character B play a role as the main character 1. Also, the number of the work where the character A plays a role as the main character and the character B plays a role as the side character or the work where the character A plays a role as the side character and also the character B plays a role as the main character is 1. Then, the number of the work where both the character A and the character B play a role as the side character is 1. Therefore, the total score is 4×1+2×1+1×1=7. In other words, the relationship value representing the relationship between the character A and the character B is 7.

Similarly, the work where both the character A and the character C play a role as the main character is the moving picture $M_2$. Also, the work where the character A plays a role as the main character and the character C plays a role as the side character or the work where the character A plays a role as the side character and the character C plays a role as the main character is the moving picture $M_1$. Then, the work where both the character A and the character C play a role as the side character does not exist. From these results, with regard to the pair of the character A and the character C, the number of the work where both the character A and the character C play a role as the main character is 1. Also, the number of the work where the character A plays a role as the main character and the character C plays a role as the side character or the work where the character A plays a role as the side character and the character C play a role as the main character is 1. Then, the number of the work where both the character A and the character C play a role as the side character is 0. Therefore, the total score is 4×1+2×1+1×0=6. In other words, the relationship value representing the relationship between the character A and the character C is 6.

Similarly, the work where both the character B and the character C play a role as the main character does not exist. Also, the work where the character B plays a role as the main character and the character C plays a role as the side character or the work where the character B plays a role as the side character and the character C plays a role as the main character is the moving picture $M_1$. Then, the work where both the character B and the character C play a role as the side character does not exist. From these results, with regard to the character B and the character C, the number of the work where both the character B and the character C play a role as the main character is 0. Also, the number of the work where the character B plays a role as the main character and the character C plays a role as the side character or the work where the character B plays a role as the side character and the character C plays a role as the main character is 1. Then, the number of the work where both the character B and the character C play a role as the side character is 0. Therefore, the total score is 4×0+2×1+1×0=2. In other words, the relationship value representing the relationship between the character B and the character C is 2.

When the relationship value related to the same character is similarly calculated and these relationship values are summarized, the relationship matrix illustrated in FIG. 10 is obtained. It should be noted that herein, the total value of the scores is set as the relationship value as it is, but a square root of the total value may be set as the relationship value. Also, it is suitable to utilize the numeric value processed through a multiplication with a predetermined coefficient, a normalization, or the like as the relationship value. For example, it is suitable to carry out the normalization so that all the diagonal components correspond to 1. Also, in the above-description explanation, the method of carrying out the scoring in accordance with the combination of the roles has been exemplified, but for example, a role weight RW may be defined in the following manner, and a relationship value Rel may be calculated on the basis of the following expression (1). The role weight RW ($M_k$, A) takes 2 in a case where the role of the character A is the main character in a moving picture $M_k$, 1 in a case where the role is the side character, and 0 in a case where the character A does not appear. Also, Rel (A, B) represents a relationship value indicating a relationship between the character A and the character B.

$$Rel(A, B) = \sqrt{\sum_k \{RW(M_k, A) \cdot RW(M_k, B)\}} \quad (1)$$

In the above, the calculation method for the relationship value based on the number of joint appearance works (weighted) has been described.

(1-2-5: Calculation Method for Relationship Value Based on Appearance Time)

Next, while referring to FIG. 11, a calculation method for a relationship value based on an appearance time will be described. FIG. 11 is an explanatory diagram for describing the calculation method for the relationship value based on the appearance time. Here, the method of calculating a relationship value by utilizing the appearance times of the respective characters in the respective moving pictures will be described. It should be noted that the targeted moving picture group is set as the moving pictures $M_1$ to $M_6$. Also, the characters appearing in the moving pictures $M_1$ to $M_6$ are set as the character A, the character B, and the character C.

When the section metadata is utilized, as illustrated in FIG. 11, the joint appearance relationships between the character A, the character B, and the character C are obtained. In the example of FIG. 11, the appearance characters in the moving picture $M_1$ are the character A, the character B, and the character C. Also, the appearance characters in the moving picture $M_2$ are the character A and the character C. Furthermore, the appearance character in the moving picture $M_3$ is only the character B. Then, the appearance character in the moving picture $M_4$ is only the character A. Also, the appearance characters in the moving picture $M_5$ are the character A and the character B. Furthermore, the appearance characters in the moving picture $M_6$ are the character A and the character B. In other words, the works where the character A and the character B jointly appear are the moving picture $M_1$, the moving picture $M_5$, and the moving picture $M_6$. Also, the works where the character A and the character C jointly appear are the moving picture $M_1$ and the moving picture $M_2$. Furthermore, the work where the character B and the character C jointly appear is only the moving picture $M_1$.

In addition, when the section metadata is utilized, as illustrated in FIG. 11, it is found out that in the moving picture $M_1$, the appearance time of the character A is 40, the appearance time of the character B is 30, and the appearance time of the character C is 10. Similarly, it is found out that in the moving picture $M_2$, the appearance time of the character A is 30, and the appearance time of the character C is 40. Also, it is found out that in the moving picture $M_3$, the appearance time of the character B is 20. Furthermore, it is found out that in the moving picture $M_4$, the appearance time of the character A is 10. Then, it is found out that in the moving picture $M_5$, the appearance time of the character A is 5, and the appearance time of the character B is 10. Also, it is found out that in the moving picture $M_6$, the appearance time of the character A is 40, and the appearance time of the character B is 5.

It can be mentioned that the character having a long appearance time plays an important role in the moving picture. Also, the relationship between the characters mutually appearing as the important role is considered to be strong. In contrast, the relationship between the characters mutually having a short appearance time is considered to be weak. For example, the relationship between the characters appearing as a small role is to be evaluated as insignificant. From the above-mentioned ideas, an appearance time PSL is defined, and a method of calculating the relationship value Rel on the basis of the following expression (2) is proposed. It should be noted however that the appearance time PSL ($M_k$, A) represents an appearance time of the character A in the moving picture $M_k$. The appearance time PSL ($M_k$, A) takes 0 in a case where the character A does not appear. Also, Rel (A, B) represents a relationship value indicating a relationship between the character A and the character B. It should be noted that a square root of a right-hand member may be set as the relationship value.

$$Rel(A, B) = \sum_k \{PSL(M_k, A) \cdot PSL(M_k, B)\} \quad (2)$$

In the example of FIG. 11, the relationship value indicating the relationship between the character A and the character B is 40×30 (moving picture $M_1$)+30×0 (moving picture $M_2$)+0×20 (moving picture $M_3$)+10×0 (moving picture $M_4$)+5×10 (moving picture $M_5$)+40×5 (moving picture $M_6$)=1450. When the calculation is similarly conducted, the relationship value indicating the relationship between the character A and the character C is 1600, and the relationship value indicating the relationship between the character B and the character C is 300. When these numeric values are summarized, the relationship matrix illustrated in FIG. 11 is obtained. It should be noted that the score is described as the relationship value as it is, but it is suitable to utilize the numeric value processed through a multiplication with a predetermined coefficient, a normalization, or the like as the relationship value. For example, it is suitable to carry out the normalization so that all the diagonal components correspond to 1.

In the above, the calculation method for the relationship matrix based on the calculation method for relationship has been described.

(1-2-6: Calculation Method for Relationship Value Based on Appearance Scene Time)

Next, while referring to FIG. 12, a calculation method for a relationship value based on an appearance scene time will be described. FIG. 12 is an explanatory diagram for describing the calculation method for the relationship value based on the appearance scene time. Here, the method of calculating a relationship value by utilizing the joint appearance scene times in the respective moving pictures will be described. It should be noted that the targeted moving picture group is set as the moving pictures $M_1$ to $M_6$. Also, the characters appearing in the moving pictures $M_1$ to $M_6$ are set as the character A, the character B, and the character C.

When the section metadata is utilized, as illustrated in FIG. 12, the joint appearance scene times related to the pairs of the respective characters with regard to the respective moving pictures are obtained. It should be noted that in FIG. 12, a joint appearance scene time with regard to a character X and a character Y is represented as [X, Y]. For example, the joint appearance scene time with regard to the pair of the character A and the character B in the moving picture $M_1$ is [A, B]=20. Similarly, with regard to the moving picture $M_1$, results of [A, A]=40, [B, B]=30, [C, C]=10, [A, C]=5, and [B, C]=5 are obtained. It should be noted that [A, A] indicates a length of the section where the character A and the character A jointly appear, but since the same character is the target, [A, A] is matched with the appearance time of the character A. The same applies to [B, B] and [C, C].

The relationship between the characters appearing in the same movie scene is considered to be strong. For example, characters in a relationship of having a conversation of course appear in the same movie scene. Also, a frequency at which characters having a hostile relationship or a friendly relationship appear in the same movie scene in the moving picture is high. A frequency at which a character playing a hero role and a character playing a heroine role appear in the same movie scene is also high. From the above-mentioned ideas, a joint appearance scene time CSL is defined, a method of calculating the relationship value Rel on the basis of the following expression (3) is proposed. It should be noted however that the joint appearance scene time CSL ($M_k$, A, B) represents a length of a section in which the character A and the character B jointly appear in the moving picture $M_k$. The joint appearance scene time CSL ($M_k$, A, B) takes 0 in a case where one of these characters does not appear. Also, Rel (A, B) represents a relationship value indicating a relationship between the character A and the character B. It should be noted that a square root of a right-hand member may be set as the relationship value.

$$Rel(A, B) = \sum_k CSL(M_k, A, B) \quad (3)$$

In the example of FIG. 12, the relationship value indicating the relationship between the character A and the character B is 20 (moving picture $M_1$)+0 (moving picture $M_2$)+0 (moving picture $M_3$)+0 (moving picture $M_4$)+5 (moving picture $M_5$)+5 (moving picture $M_6$)=30. When the calculation is similarly conducted, the relationship value indicating the relationship between the character A and the character C is 25, and the relationship value indicating the relationship between the character B and the character C is 5. When these numeric values are summarized, the relationship matrix illustrated in FIG. 12 is obtained. It should be noted that herein, the total value of the joint appearance scene times is described as the relationship value as it is, but it is suitable to utilize the numeric value processed through a multiplication with a predetermined coefficient, a normalization, or the like as the relationship value. For example, it is suitable to carry out the normalization so that all the diagonal components correspond to 1.

In the above, the calculation method for the relationship matrix based on the joint appearance scene time has been described.

As described above, it is possible to evaluate the relationship between the characters from the various viewpoints on the basis of the information obtained by utilizing the section metadata. It should be noted that the calculation method for the relationship value described herein is an example, and for example, the relationship value can also be calculated by utilizing the appearance time, the joint appearance scene time, and the like, which are weighted in accordance with the size of the face area. Also, it is possible to calculate the relationship value by utilizing the appearance time, the joint appearance scene time, and the like, which are weighted by taking into account the distinction between the main character/the side character or the distinction between the child, the adult, the male character, the female character, the age, and the like.

(Other Method 1: Joint Appearance Scene Time+Role Weight)

As an example, a method of calculating the relationship value Rel by combining the joint appearance scene time CSL with the role weight RW will be introduced. It should be noted that the definitions of CSL and RW are the same as those already described above. In this example, the relationship value Rel (A, B) is calculated from the following expression (4). It should be noted that the square root of the right-hand member may be omitted. According to this method, the relationship value taking into account both the role weights indicating the importance levels of the respective characters in the respective moving pictures and the joint appearance scene times indicating the relationships between the characters in the respective moving pictures is calculated.

$$Rel(A, B) = \sqrt{\sum_k \{RW(M_k, A) \cdot RW(M_k, B) \cdot CSL(M_k, A, B)\}} \quad (4)$$

(Other Method 2: Joint Appearance Scene Time+Appearance Time)

As another example, a method of calculating the relationship value Rel by combining the joint appearance scene time CSL with the appearance time PSL will be introduced. It should be noted that the definitions of CSL and PSL are the same as those already described above. In this example, the relationship value Rel (A, B) is calculated from the following expression (5). It should be noted that the square root of the right-hand member may be omitted. According to this method, the relationship value taking into account both the appearance times indicating the importance levels of the respective characters in the respective moving pictures and the joint appearance scene times indicating the relationships between the characters in the respective moving pictures is calculated.

$$Rel(A, B) = \sqrt{\sum_k \{PSL(M_k, A) \cdot PSL(M_k, B) \cdot CSL(M_k, A, B)\}} \quad (5)$$

[1-3: Expansion of Relationship Information]

Incidentally, the relationship value described so far is the numerical value obtained by quantifying the magnitude of the relationship under a predetermined condition. Certainly, by utilizing this numerical value, the relationship between the appearance materials can be objectively judged. However, it is also supposed that a case may occur in which a type of the relationship is suitably taken into account when an abstract of the moving picture is created. Thus, the definition of the relationship value is expanded herein.

For example, a case may occur in which a close friend and a family are represented by the equivalent relationship value. For a method of distinguishing these relationships, for example, as illustrated in FIG. 13, a method of setting an attribute to a relationship value and determining a type of the relationship by utilizing the attribute is conceivable. Also, a case may occur in which an intimacy that the character A feels to the character B and an intimacy that the character B to the character A are different from each other. In view of the above, as illustrated in FIG. 13, an asymmetric diversity of the relationship matrix is permitted. In the example of FIG. 13, for the character A, the character C is an enemy, and for the character C, the character A is a friend. By expanding the structure of the relationship matrix in this manner, it is possible to more flexibly set an abstract condition.

In the above, the outline of the moving picture abstract technique according to the present embodiment and the associated technologies have been described.

2: EMBODIMENTS

An embodiment of the present technology will be described. The present embodiment is related to the moving picture abstract technique.

[2-1: Configuration of Information Processing Apparatus 100]

Figure 14:
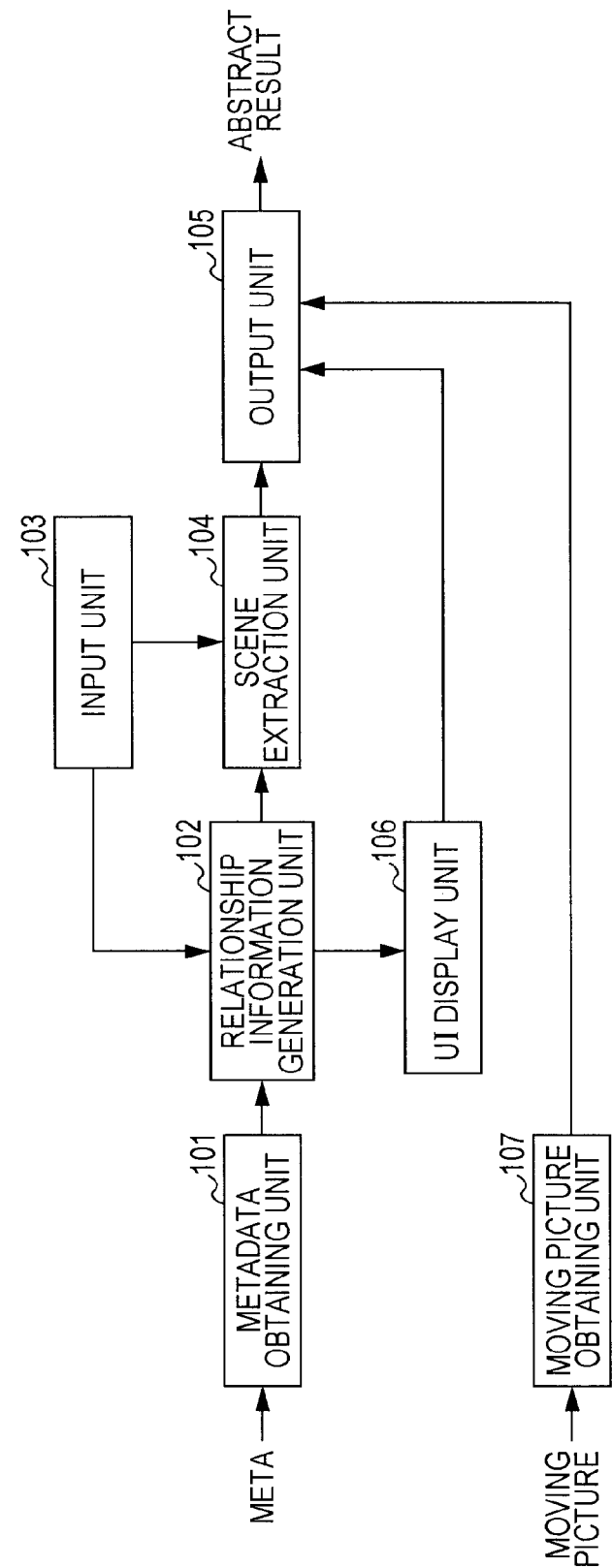
FIG. 14 is an explanatory diagram for describing a configuration example of an information processing apparatus according to a present embodiment.
Figure 15:
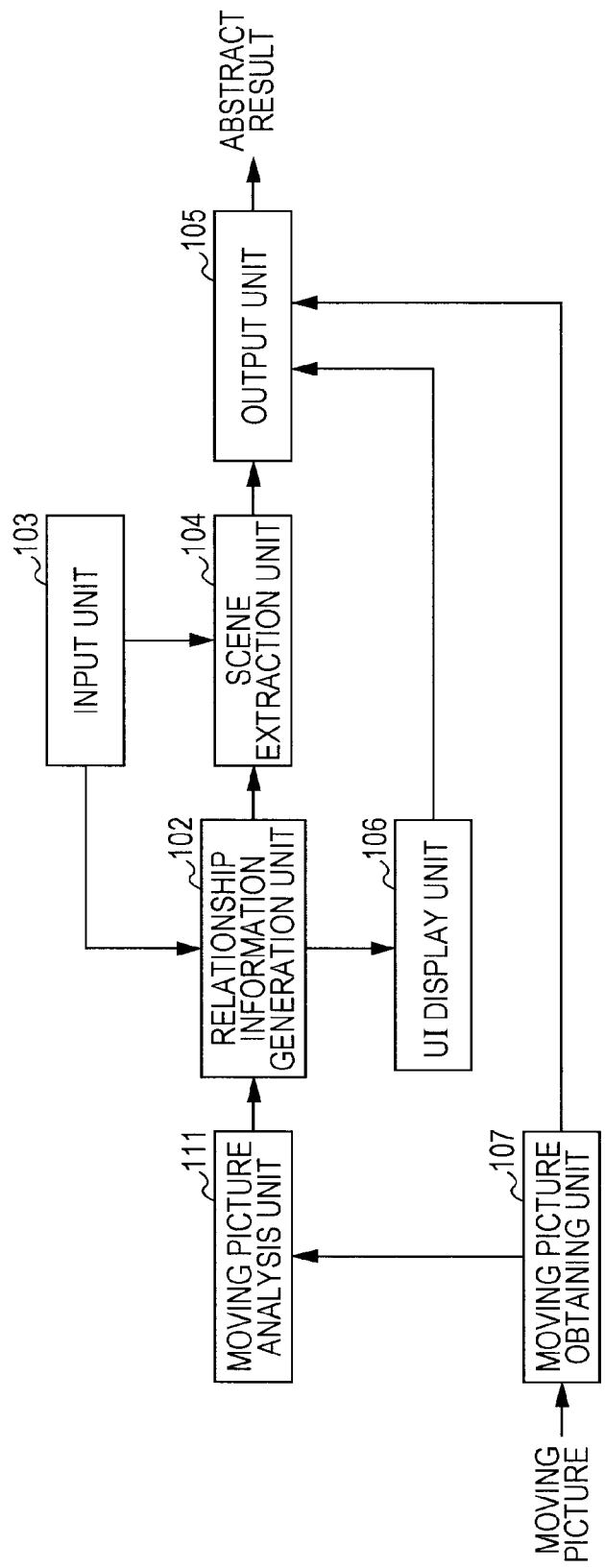
FIG. 15 is an explanatory diagram for describing a configuration example (modified example #1) of the information processing apparatus according to the present embodiment.
Figure 16:
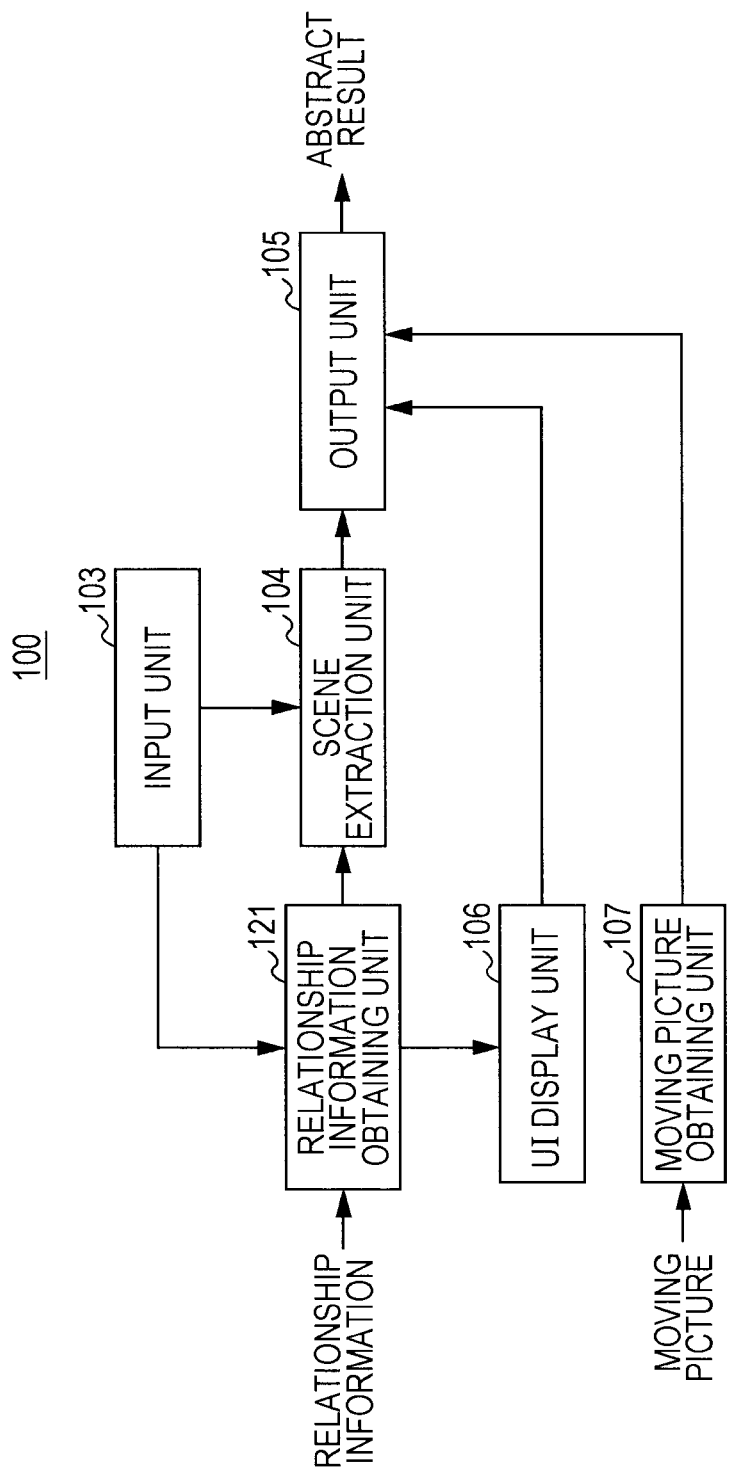
FIG. 16 is an explanatory diagram for describing a configuration example (modified example #2) of the information processing apparatus according to the present embodiment.

First, while referring to FIGS. 14 to 16, the configuration example of the information processing apparatus 100 according to the present embodiment will be described. FIG. 14 is an explanatory diagram for describing a standard configuration of the information processing apparatus 100. FIG. 15 is an explanatory diagram for describing a configuration of the information processing apparatus 100 according to a modified example (modified example #1). FIG. 16 is an explanatory diagram for describing a configuration of the information processing apparatus 100 according to another modified example (modified example #2).

(2-1-1: Standard Configuration)

As illustrated in FIG. 14, the information processing apparatus 100 is mainly composed of a metadata obtaining unit 101, a relationship information generation unit 102, an input unit 103, a scene extraction unit 104, an output unit 105, a UI display unit 106, and a moving picture obtaining unit 107. The information processing apparatus 100 may be contained in a housing for a variety of devices, including a tablet computer, a TV remote controller, smartphone, PC, etc. Although he relationship information generation unit 102 is shown to be in the same housing as the other components, the system need not be configured as a self-contained unit. For example, the scene extraction unit may be located in a remote computer (such as a cloud server) and the other components provide queries (or input) toe the remote computer, and the remote computer performs the relationship information generation, manipulation, and even scene changes, and sends the result to the requesting device.

When the abstract process of the moving picture is started, the metadata obtaining unit 101 obtains moving picture time-line metadata. For example, the metadata obtaining unit 101 obtains moving picture time-line metadata from a storage apparatus (not illustrated) provided in a casing of the information processing apparatus 100, a storage apparatus (not illustrated) connected to a network, a service that provides the moving picture time-line metadata, or the like. Then, the moving picture time-line metadata obtained by the metadata obtaining unit 101 is input to the relationship information generation unit 102.

When the moving picture time-line metadata is input, the relationship information generation unit 102 utilizes the input moving picture time-line metadata and generates relationship information (information including the relationship value, the attribute, and the like). Then, the relationship information generated by the relationship information generation unit 102 is input to the scene extraction unit 104 and the UI display unit 106. It should be noted that in a case where the user performs a change operation on the information on the relationship information via the input unit 103, the relationship information generation unit 102 causes the content of the change operation to be reflected on the relationship information. Then, the relationship information after the change is input to the scene extraction unit 104 and the UI display unit 106.

When the relationship information is input, the scene extraction unit 104 extracts scenes on the basis of the input relationship information and the information on the appearance material selected by the user via the input unit 103. It should be noted that the content of the extraction process by the scene extraction unit 104 will be described in detail in a later stage.

The information on the scene extracted by the scene extraction unit 104 is input to the output unit 105. When the extracted scene information is input, the output unit 105 outputs an abstract result on the basis of the input scene information. For example, the output unit 105 plays the scene extracted by the scene extraction unit 104 (digest play) or disposes and displays the images representing the relevant scene (comics display) among the moving picture obtained by the moving picture obtaining unit 107. Also, the output unit 105 may be configured to output the information on the section corresponding to the scene extracted by the scene extraction unit 104 to an external device. It should be noted that the moving picture obtaining unit 107 obtains the moving picture from the storage apparatus (not illustrated) provided in the casing of the information processing apparatus 100, the storage apparatus (not illustrated) connected to the network, the service that provides the moving picture, or the like.

The output unit 105 displays an image of the user interface generated by the UI display unit 106. This user interface is utilized for presenting the relationship information to the user. Also, this user interface is utilized for the user to change the relationship information. The US display unit 106 may be a touch screen display that accepts single touch or multitouch gestures, or a proximity detection device. The generation of the components constituting this user interface and the display control are executed by the UI display unit 106. It should be noted that the configuration of this user interface will be described in detail in a later stage.

In the above, the standard configuration of the information processing apparatus 100 has been described.

(2-1-2: Modified Example #1 (Configuration of Automatically Generating Metadata from Moving Picture))

Next, while referring to FIG. 15, a configuration of the information processing apparatus 100 according the modified example #1 will be described. The configuration of the modified example #1 is different from the standard configuration illustrated in FIG. 14 in that the moving picture time-line metadata is automatically extracted from the moving picture.

As illustrated in FIG. 15, the information processing apparatus 100 is mainly composed of a moving picture analysis unit 111, the relationship information generation unit 102, the input unit 103, the scene extraction unit 104, the output unit 105, the UI display unit 106, and the moving picture obtaining unit 107.

When the abstract process of the moving picture is started, the moving picture analysis unit 111 analyzes the moving picture obtained by the moving picture obtaining unit 107 and generates moving picture time-line metadata. It should be noted that the moving picture obtaining unit 107 obtains the moving picture from the storage apparatus (not illustrated) provided in the casing of the information processing apparatus 100, the storage apparatus (not illustrated) connected to the network, the service that provides the moving picture, or the like. The moving picture time-line metadata generated by the moving picture analysis unit 111 is input to the relationship information generation unit 102.

When the moving picture time-line metadata is input, the relationship information generation unit 102 utilizes the input moving picture time-line metadata and generates relationship information and generates relationship information. Then, the relationship information generated by the relationship information generation unit 102 is input to the scene extraction unit 104 and the UI display unit 106. It should be noted that in a case where the user performs the change operation on the information on the relationship information via the input unit 103, the relationship information generation unit 102 causes the content of the change operation to be reflected on the relationship information. Then, the relationship information after the change is input to the scene extraction unit 104 and the UI display unit 106.

When the relationship information is input, the scene extraction unit 104 extracts the scenes on the basis of the input relationship information and the information on the appearance material selected by the user via the input unit 103. It should be noted that the content of the extraction process by the scene extraction unit 104 will be described in detail in a later stage.

The information on the scene extracted by the scene extraction unit 104 is input to the output unit 105. When the extracted scene information is input, the output unit 105 outputs the abstract result on the basis of the input scene information. For example, the output unit 105 plays the scene extracted by the scene extraction unit 104 (digest play) or disposes and displays the images representing the relevant scene (comics display) among the moving picture obtained by the moving picture obtaining unit 107. Also, the output unit 105 may be configured to output the information on the section corresponding to the scene extracted by the scene extraction unit 104 to the external device.

The output unit 105 displays the image of the user interface generated by the UI display unit 106. This user interface is utilized for presenting the relationship information to the user. Also, this user interface is utilized for the user to change the relationship information. The generation of the components constituting this user interface and the display control are executed by the UI display unit 106. It should be noted that the configuration of this user interface will be described in detail in a later stage.

In the above, the configuration of the information processing apparatus 100 according the modified example #1 has been described.

(2-1-3: Modified Example #2 (Configuration of Utilizing Predetermined Relationship Information))

Next, while referring to FIG. 16, a configuration of the information processing apparatus 100 according to a modified example #2 will be described. The configuration of the modified example #2 is different from the standard configuration illustrated in FIG. 14 in that the relationship information is obtained from an external part of the system.

As illustrated in FIG. 16, the information processing apparatus 100 is mainly composed of a relationship information obtaining unit 121, the input unit 103, the scene extraction unit 104, the output unit 105, the UI display unit 106, and the moving picture obtaining unit 107.

When the abstract process of the moving picture is started, the relationship information obtaining unit 121 obtains relationship information. It should be noted that the relationship information obtaining unit 121 obtains the relationship information from the storage apparatus (not illustrated) provided in the casing of the information processing apparatus 100, the storage apparatus (not illustrated) connected to the network, the service that provides the relationship information, or the like. Then, the relationship information obtained by the relationship information obtaining unit 121 is input to the scene extraction unit 104 and the UI display unit 106. It should be noted that in a case where the user performs the change operation on the information on the relationship information via the input unit 103, the relationship information obtaining unit 121 causes the content of the change operation to be reflected on the relationship information. Then, the relationship information after the change is input to the scene extraction unit 104 and the UI display unit 106.

When the relationship information is input, the scene extraction unit 104 extracts the scenes on the basis of the input relationship information and the information on the appearance material selected by the user via the input unit 103. It should be noted that the content of the extraction process by the scene extraction unit 104 will be described in detail in a later stage.

The information on the scene extracted by the scene extraction unit 104 is input to the output unit 105. When the extracted scene information is input, the output unit 105 outputs the abstract result on the basis of the input scene information. For example, the output unit 105 plays the scene extracted by the scene extraction unit 104 (digest play) or disposes and displays the images representing the relevant scene (comics display) among the moving picture obtained by the moving picture obtaining unit 107. Also, the output unit 105 may be configured to output the information on the section corresponding to the scene extracted by the scene extraction unit 104 to the external device.

The output unit 105 displays the image of the user interface generated by the UI display unit 106. This user interface is utilized for presenting the relationship information to the user. Also, this user interface is utilized for the user to change the relationship information. The generation of the components constituting this user interface and the display control are executed by the UI display unit 106. It should be noted that the configuration of this user interface will be described in detail in a later stage.

In the above, a configuration of the information processing apparatus 100 according to the modified example #2 has been described.

[2-2: Operation of Information Processing Apparatus 100]

Next, while referring to FIGS. 17 to 27, an operation of the information processing apparatus 100 according to the present embodiment will be described. It should be noted that hereinafter, the description will be given while is supposed for the convenience of the description.

(2-2-1: Basic Operation)

First, while referring to FIG. 17, a basic operation of the information processing apparatus 100 will be described.

Figure 17:
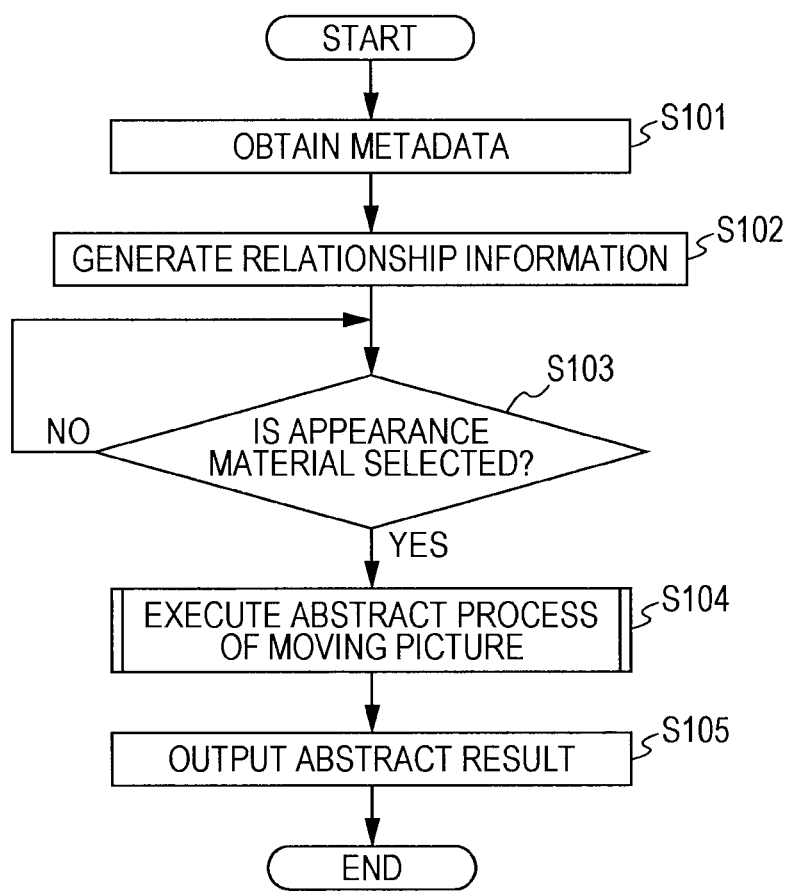
FIG. 17 is an explanatory diagram for describing an operation example of the information processing apparatus according to the present embodiment.

As illustrated in FIG. 17, when the abstract process of the moving picture is started the information processing apparatus 100 obtains moving picture time-line metadata through the function of the metadata obtaining unit 101 (S101). Subsequently, the information processing apparatus 100 generates relationship information by using the moving picture time-line metadata through the function of the relationship information generation unit 102 (S102). Subsequently, the information processing apparatus 100 determines whether or not an appearance material is selected by the user (S103). In a case where the appearance material is selected, the information processing apparatus 100 advances the process to step S104. On the other hand, in a case where the appearance material is not selected, the information processing apparatus 100 returns the process to step S103.

In a case where the process is advanced to step S104, the information processing apparatus 100 executes an abstract process of the moving picture on the basis of the relationship information through a function of the scene extraction unit 104 (S104). It should be noted that a detail of the abstract process executed in step S104 will be described below. Subsequently, the information processing apparatus 100 outputs a result of the abstract process through a function of the output unit 105 (S105). When the result of the abstract process is output, the information processing apparatus 100 ends a series of processes related to the abstract process for the moving picture.

In the above, the basis operation of the information processing apparatus 100 has been described.

(2-2-2: Abstract Process #1 (Method of Maximizing Total Sum Of Relationship Values)

Figure 18:
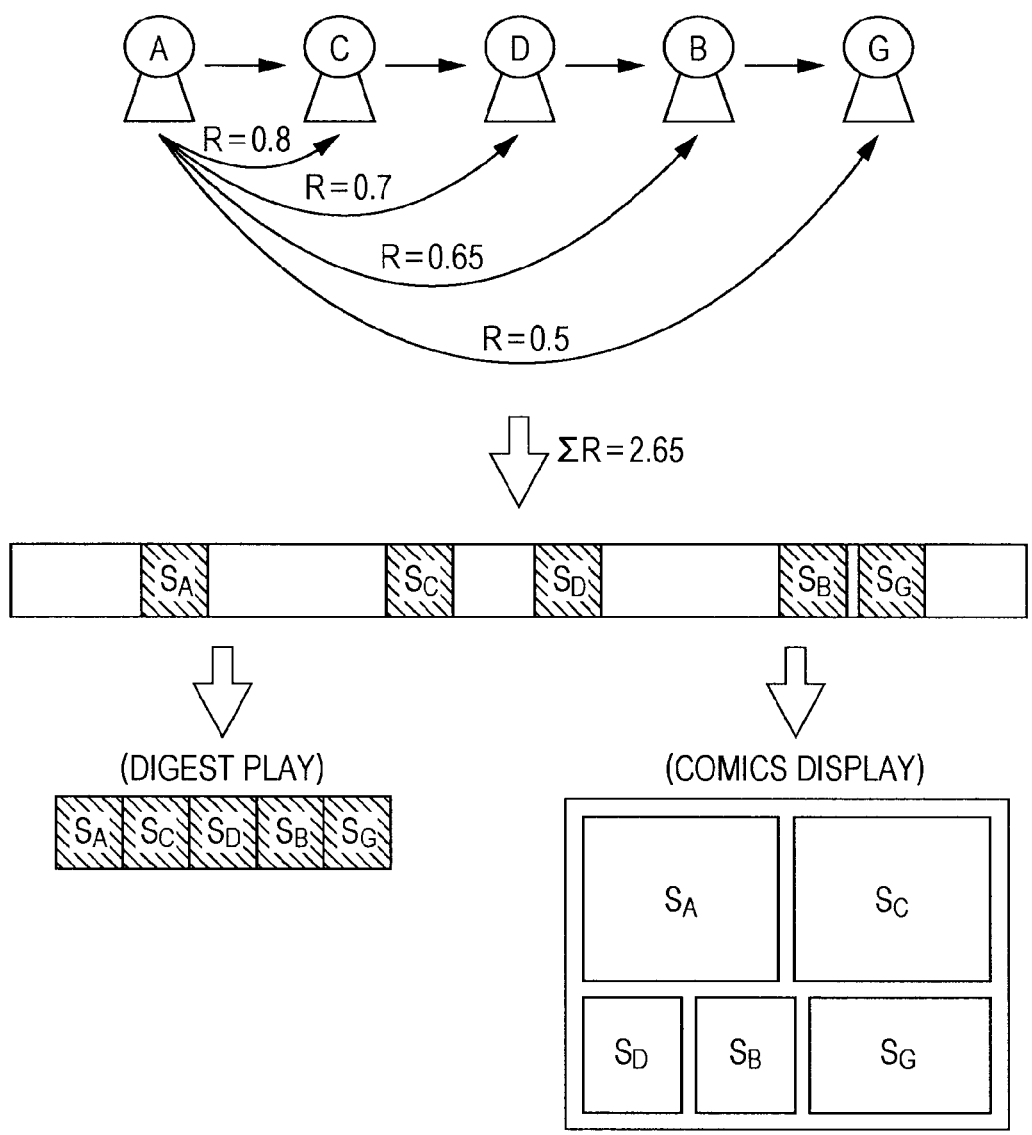
FIG. 18 is an explanatory diagram for describing an operation example of the information processing apparatus according to the present embodiment.

Next, while referring to FIGS. 18 and 19, an example of the abstract process executed in step S104 will be described in more detail. Here, a method of selecting the scene so as to maximize the total sum of the relationship values (hereinafter, which will be referred to as abstract process #1) will be described. FIG. 18 is an explanatory diagram for describing an outline of the abstract process #1. Also, FIG. 19 is an explanatory diagram for describing an operation of the information processing apparatus 100 related to the abstract process #1.

First, a reference is made on FIG. 18. In a case where the appearance material A is selected by the user, as illustrated in FIG. 18, the information processing apparatus 100 calculates relationship values R between the respective appearance materials and an appearance material A appearing in the moving picture. Then, the information processing apparatus 100 selects a predetermined number of appearance materials in a descending order of the relationship value R. In the example of FIG. 18, an appearance material C, an appearance material D, an appearance material B, and an appearance material G are selected in the descending order of the relationship value R. By selecting the appearance materials in the above-mentioned manner, the total sum of the relationship values R between the selected appearance materials and the appearance material A is maximized. When the appearance materials are selected, the information processing apparatus 100 extracts sections where the respective selected appearance materials in the moving picture. Then, the information processing apparatus 100 plays the moving pictures of the sections in a time-series manner or disposes and displays the images representing the respective sections.

Figure 19:
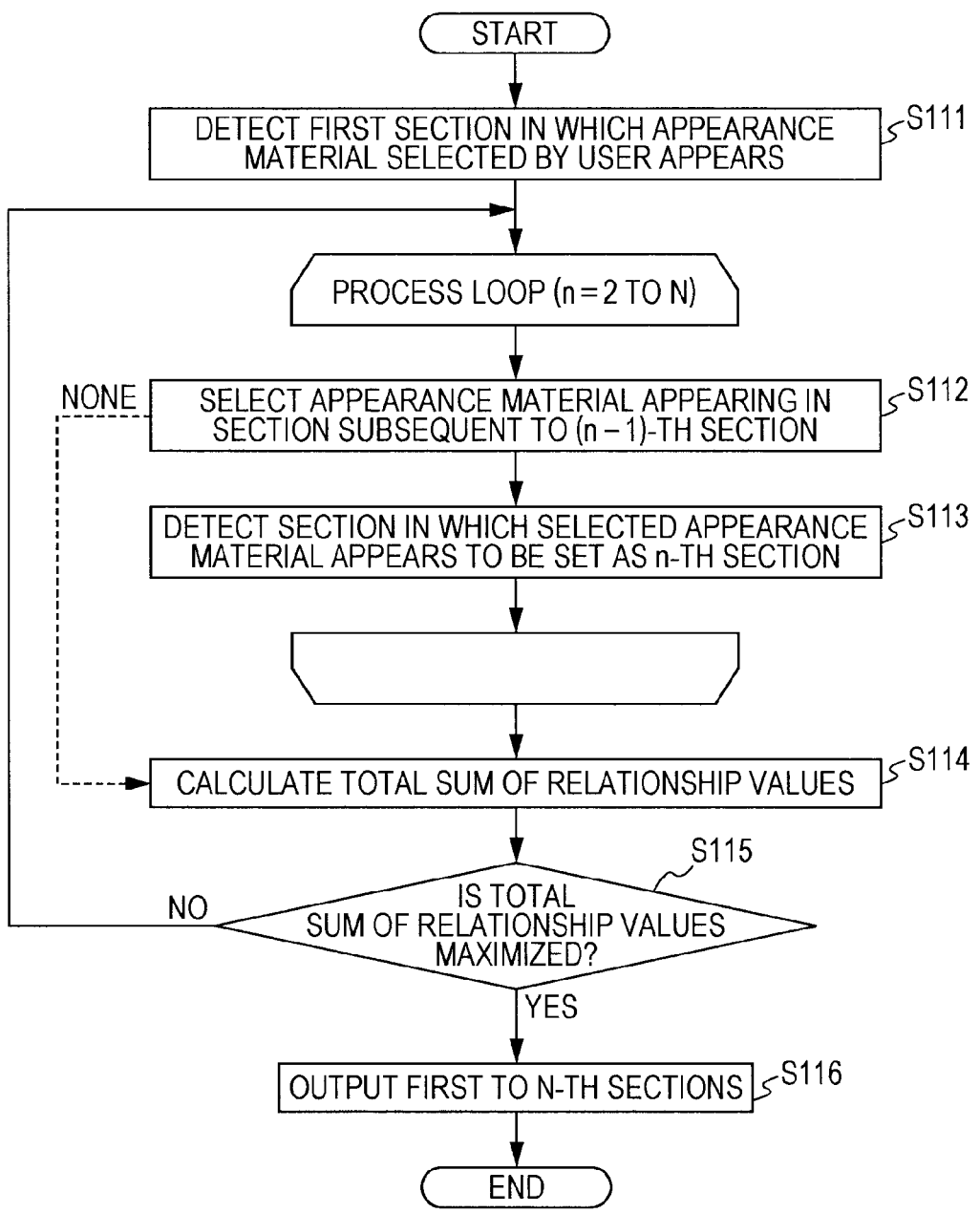
FIG. 19 is an explanatory diagram for describing an operation example of the information processing apparatus according to the present embodiment.

Next, a reference is made on FIG. 19. In the example of FIG. 18, the predetermined number of appearance materials are simply selected in the descending order of the relationship value R, but a case is also conceivable in which it is suitable to extract a predetermined number of sections so that the total sum of the relationship values R is maximized. In addition, a case is conceivable in which the relationship values R related to all the appearance materials appearing in the respective sections are taken into account. To be adapted with the above-mentioned case, for example, the abstract process for the moving picture may be executed along the flow of the process illustrated in FIG. 19.

As illustrated in FIG. 19, first, the information processing apparatus 100 detects a section (first section) in which an appearance material selected by the user appears (S111). Subsequently, the information processing apparatus 100 starts a processing loop related to n=2 to N. First, the information processing apparatus 100 selects an appearance material appearing in a section subsequent to the (n−1)-th section (S112). For example, the information processing apparatus 100 selects an appearance material having the relationship value R exceeding a predetermined threshold with the appearance material selected by the user. It should be noted however that in a case where the appearance material is selected in step S112, the information processing apparatus 100 advances the process to step S114. The information processing apparatus 100 that has selected the appearance material detects a section in which the selected appearance material appears and sets the detected section as the n-th section (S113). After the processes in step S112 and S113 are executed with regard to n=2 to N, the information processing apparatus 100 advances the process to step S114.

The information processing apparatus 100 that has advanced the process to step S114 calculates relationship values R between the appearance material selected by the user and the respective appearance materials appearing in the second to n-th sections and counts up the total sum of the calculated relationship values R (S114). Subsequently, the information processing apparatus 100 determines whether or not the total sum of the relationship values R calculated in step S114 is maximized (S115). In a case where the total sum of the relationship values R is maximized, the information processing apparatus 100 advances the process to step S116. On the other hand, in a case where the total sum of the relationship values R is not maximized, the information processing apparatus 100 returns the process to the subsequent stage of step S111. In a case where the process is advanced to step S116, the information processing apparatus 100 outputs the first to N-th sections as the information on the extracted scenes (S116), and a series of processes related to the abstract process #1 is ended.

In the above, the example of the abstract process executed in step S104 has been described.

(2-2-3: Abstract Process #2 (Maximization (1) of Relationship Value Sum at Time of Scene Switching))

Figure 20:
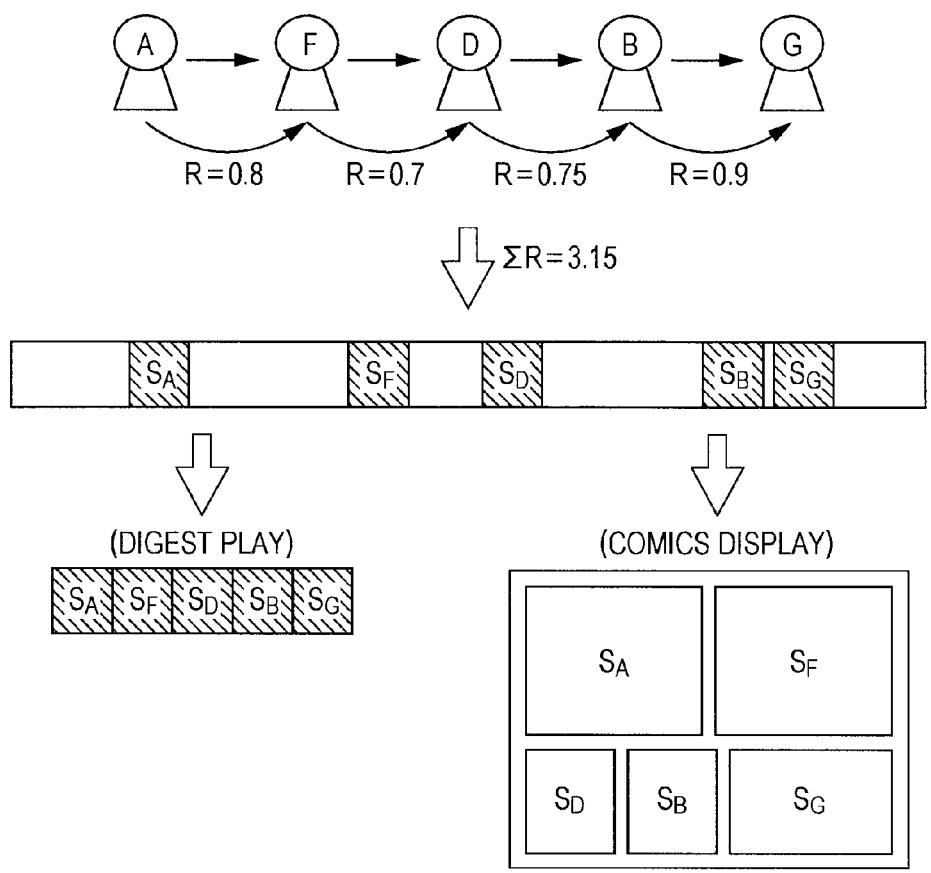
FIG. 20 is an explanatory diagram for describing an operation example of the information processing apparatus according to the present embodiment.
Figure 21:
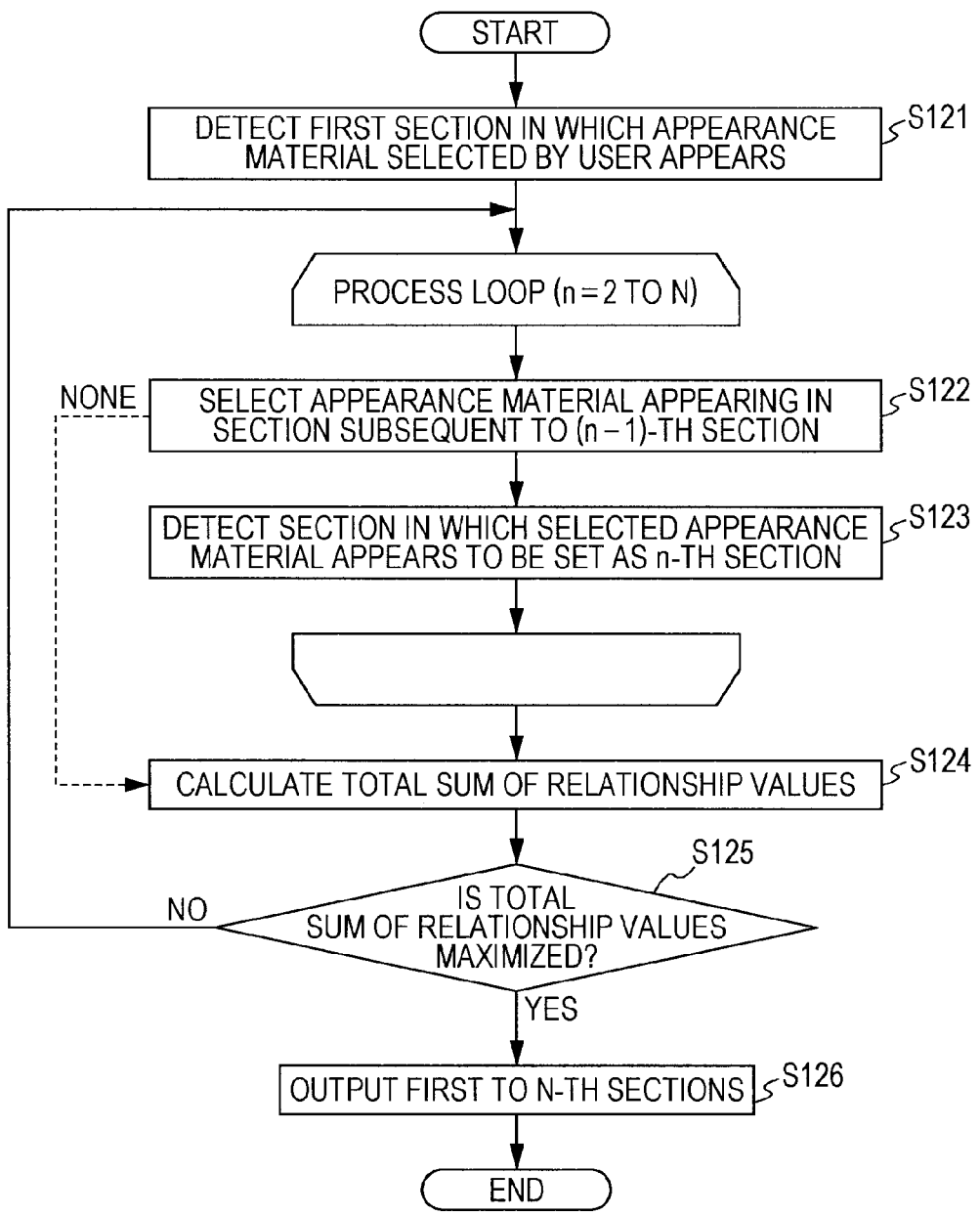
FIG. 21 is an explanatory diagram for describing an operation example of the information processing apparatus according to the present embodiment.

Next, while referring to FIGS. 20 and 21, another example of the abstract process executed in step S104 will be described in more detail. Here, a method of selecting the appearance material so that the relationship value sum at the time of the scene switching is maximized (hereinafter, which will be referred to as abstract process #2) will be described. FIG. 20 is an explanatory diagram for describing an outline of the abstract process #2. Also, FIG. 21 is an explanatory diagram for describing an operation of the information processing apparatus 100 related to the abstract process #2.

First, a reference is made on FIG. 20. As illustrated in FIG. 20, for example, a consideration will be given of a case in which a section $S_A$ in which an appearance material A appears, a section $S_F$ in which an appearance material F appears, a section $S_D$ in which an appearance material D appears, a section $S_B$ in which an appearance material B appears, and a section $S_G$ in which an appearance material G appears are sequentially selected. In this case, pairs of the appearance materials appearing before and after the scene switching correspond to (A, F), (F, D), (D, B), and (B, G). In view of the above, the information processing apparatus 100 calculates the relationship value R between the appearance material A and the appearance material F, the relationship value R between the appearance material F and the appearance material D, the relationship value R between the appearance material D and the appearance material B, and the relationship value R between the appearance material B and the appearance material G and counts up the total sum of those relationship values (3.15 in the example of FIG. 20).

FIG. 20 illustrates a case in which the section $S_A$, the section $S_F$, the section $S_D$, the section $S_B$, the section $S_G$ are sequentially selected, and similarly, the information processing apparatus 100 counts up the total sum of the relationship values R while changing the combinations of the selected sections. Then, the information processing apparatus 100 detects the combination of the sections in which the total sum of the relationship values R is maximized. The information processing apparatus 100 that has detected the combination of the sections plays the moving pictures of the detected sections in a time-series manner or disposes and displays the images representing the respective sections. When the technique of the abstract process #2 is applied, the appearance scene of the appearance material having the strong relationship indirectly with the appearance material selected by the user can be included in the digest play and the comics display.

For example, it is possible to realize the digest play or the like that takes into account a bond of good friends.

Here, while referring to FIG. 21, an operation of the information processing apparatus 100 another example of the abstract process executed in step S104 will be described in more detail. As illustrated in FIG. 21, first, the information processing apparatus 100 detects a section (first section) in which an appearance material selected by the user appears (S121). Subsequently, the information processing apparatus 100 starts a processing loop related to n=2 to N. First, the information processing apparatus 100 selects an appearance material appearing in a section subsequent to the (n−1)-th section (S122). For example, the information processing apparatus 100 selects an appearance material having the relationship value R exceeding a predetermined threshold with the appearance material selected by the user. It should be noted however that in a case where the appearance material is selected in step S122, the information processing apparatus 100 advances the process to step S124.

The information processing apparatus 100 that has selected the appearance material detects a section in which the selected appearance material appears and sets the detected section as the n-th section (S123). After the processes in step S122 and S123 are executed with regard to n=2 to N, the information processing apparatus 100 advances the process to step S124. The information processing apparatus 100 that has advanced the process to step S124 calculates relationship values R between the appearance material appearing in the (n−1)-th section and the appearance material appearing in the n-th section with regard to n=2 to N and counts up the total sum of the calculated relationship values R (S124).

Subsequently, the information processing apparatus 100 determines whether or not the total sum of the relationship values R calculated in step S124 is maximized (S125). In a case where the total sum of the relationship values R is maximized, the information processing apparatus 100 advances the process to step S126. On the other hand, in a case where the total sum of the relationship values R is not maximized, the information processing apparatus 100 returns the process to the subsequent stage of step S121. In a case where the process is advanced to step S126, the information processing apparatus 100 outputs the first to N-th sections as the information on the extracted scenes (S126), and a series of processes related to the abstract process #2 is ended.

In the above, the further example of the abstract process executed in step S104 has been described.

(2-2-4: Abstract Process #3 (Maximization (2) of Relationship Value Sum at Time of Scene Switching))

Figure 22:
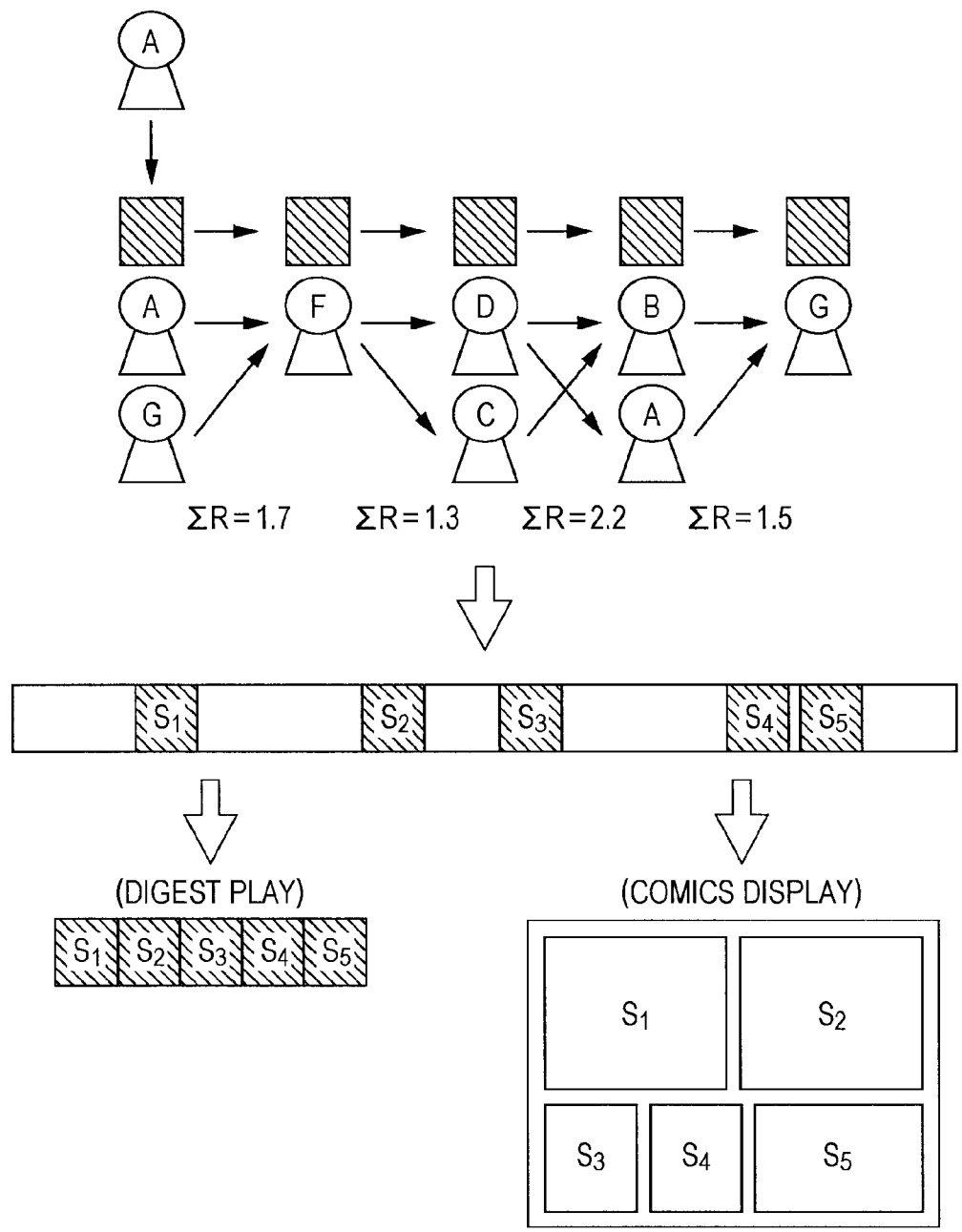
FIG. 22 is an explanatory diagram for describing an operation example of the information processing apparatus according to the present embodiment.
Figure 23:
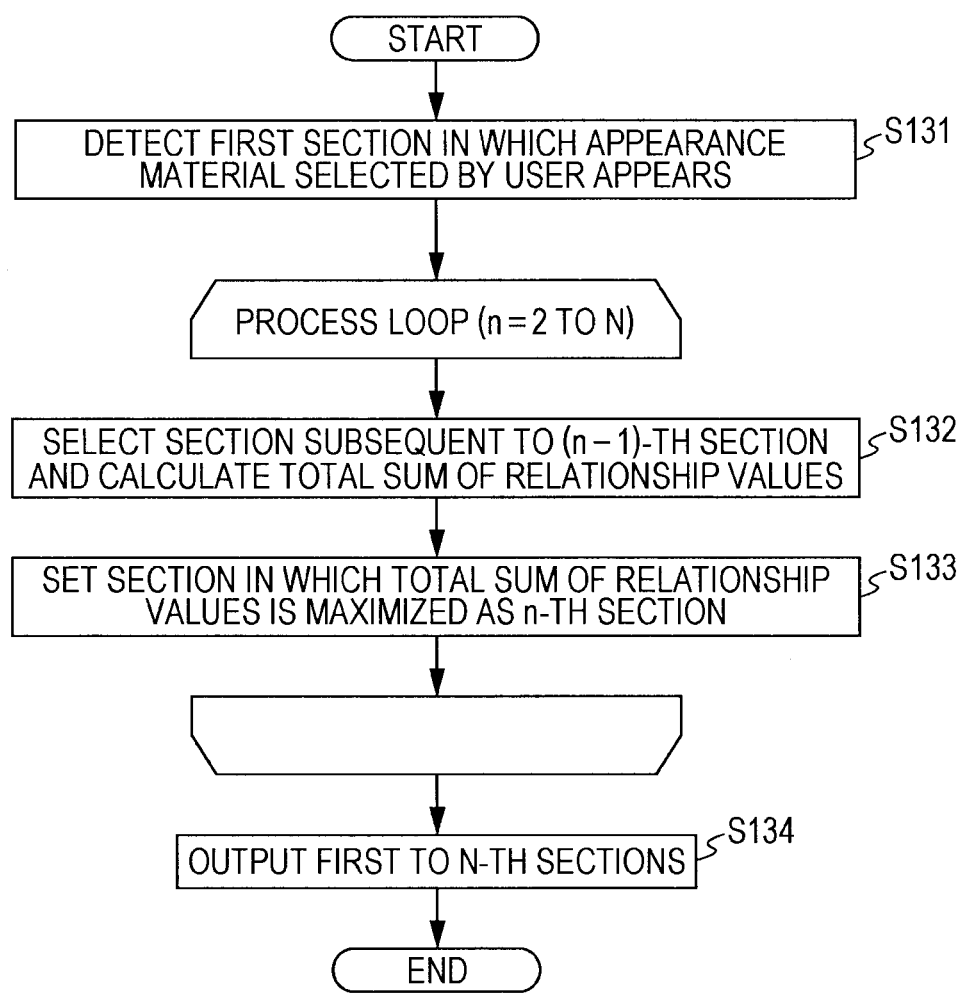
FIG. 23 is an explanatory diagram for describing an operation example of the information processing apparatus according to the present embodiment.

Next, while referring to FIGS. 22 and 23, still another example of the abstract process executed in step S104 will be described in more detail. Here, a method of selecting the appearance material so that the relationship value sum at the time of the scene switching is maximized (hereinafter, which will be referred to as abstract process #3) will be described. FIG. 22 is an explanatory diagram for describing an outline of the abstract process #3. Also, FIG. 23 is an explanatory diagram for describing an operation of the information processing apparatus 100 related to the abstract process #3.

In the case of the abstract process #2 described above, the information processing apparatus 100 successively selects the appearance material and the appearance scene of the relevant appearance material and calculates the relationship value between the appearance materials at the switching timing of the scenes. At this time, the information processing apparatus 100 calculates the relationship value between the selected appearance materials. For that reason, in the abstract process #2 described above, the relationship values related to the other appearance materials appearing in the respective scenes are not taken into account. On the other hand, the abstract process #3 described here takes into account the relationships with respect to all the appearance materials appearing in the respective scenes.

For example, as illustrated in FIG. 22, in a case where the appearance material A is selected by the user, the information processing apparatus 100 extracts a section $S_1$ in which the appearance material A appears. Subsequently, the information processing apparatus 100 detects all the appearance materials appearing in the section $S_1$. In the example of FIG. 22, the appearance material A and the appearance material G appear in the section $S_1$. Subsequently, the information processing apparatus 100 selects a section $S_2$ subsequent to the extracted section $S_1$. Then, the information processing apparatus 100 detects all the appearance materials appearing in the section $S_2$. In the example of FIG. 22, the appearance material F appears in the section $S_2$. In view of the above, the information processing apparatus 100 calculates the relationship value R between the appearance material A and the appearance material F and the relationship value R between the appearance material G and the appearance material F and counts up the total sum of those relationship values R.

While the position of the section $S_2$ is moved, the information processing apparatus 100 counts up the total sum of the relationship values R in a similar manner and searches for the section $S_2$ in which the total sum of the relationship values R is maximized. Here, the section $S_2$ in which the appearance material F appears is confirmed as the section $S_2$ in which the total sum of the relationship values R is maximized. When the position of the section $S_2$ is confirmed, the information processing apparatus 100 selects a section $S_3$ subsequent to the section $S_2$. Then, the information processing apparatus 100 detects all the appearance materials appearing in the section $S_3$. In the example of FIG. 22, the appearance material D and the appearance material C appear in the section $S_3$. In view of the above, the information processing apparatus 100 calculates the relationship value R between the appearance material F and the appearance material D and the relationship value R between the appearance material F and the appearance material C and counts up the total sum of those relationship values R.

Similarly as in the case where the section $S_2$ is confirmed, the information processing apparatus 100 searches for the section $S_3$ in which the total sum of the relationship values R is maximized. When the section $S_3$ is confirmed, the information processing apparatus 100 sequentially confirms a section $S_4$ and a section $S_5$ through a similar method. The information processing apparatus 100 that has confirmed the combinations of the sections plays the moving pictures of the confirmed sections in a time-series manner or disposes and displays the images representing the respective sections. When the technique to the abstract process #3 is applied, the appearance scene of the appearance material having the strong relationship indirectly with the appearance material selected by the user can be included in the digest play and the comics display while the relationship with the joint appearance character is also taken into account.

Here, while referring to FIG. 23, an operation of the information processing apparatus 100 related to the abstract process #3 will be described in more detail. As illustrated in FIG. 23, first, the information processing apparatus 100 detects a section (first section) in which an appearance material selected by the user appears (S131). Subsequently, the information processing apparatus 100 starts a processing loop related to n=2 to N. First, the information processing apparatus 100 selects a section subsequent to the (n−1)-th section and counts up the total sum of the relationship values between all the appearance materials appearing in the selected section and all the appearance materials appearing in the (n−1)-th section (S132). Subsequently, the information processing apparatus 100 detects a section in which the total sum of the relationship values is maximized and sets the detected section as the n-th section (S133).

After the processes in step S132 and S133 are executed with regard to n=2 to N, the information processing apparatus 100 advances the process to step S134. The information processing apparatus 100 that has advanced the process to step S134 outputs the first to N-th sections as the information on the extracted scenes (S134), and a series of processes related to the abstract process #3 is ended.

In the above, the further example of the abstract process executed in step S104 has been described.

(2-2-5: Abstract Process #4 (Minimization of Relationship Value Sum at Time of Scene Switching))

Figure 24:
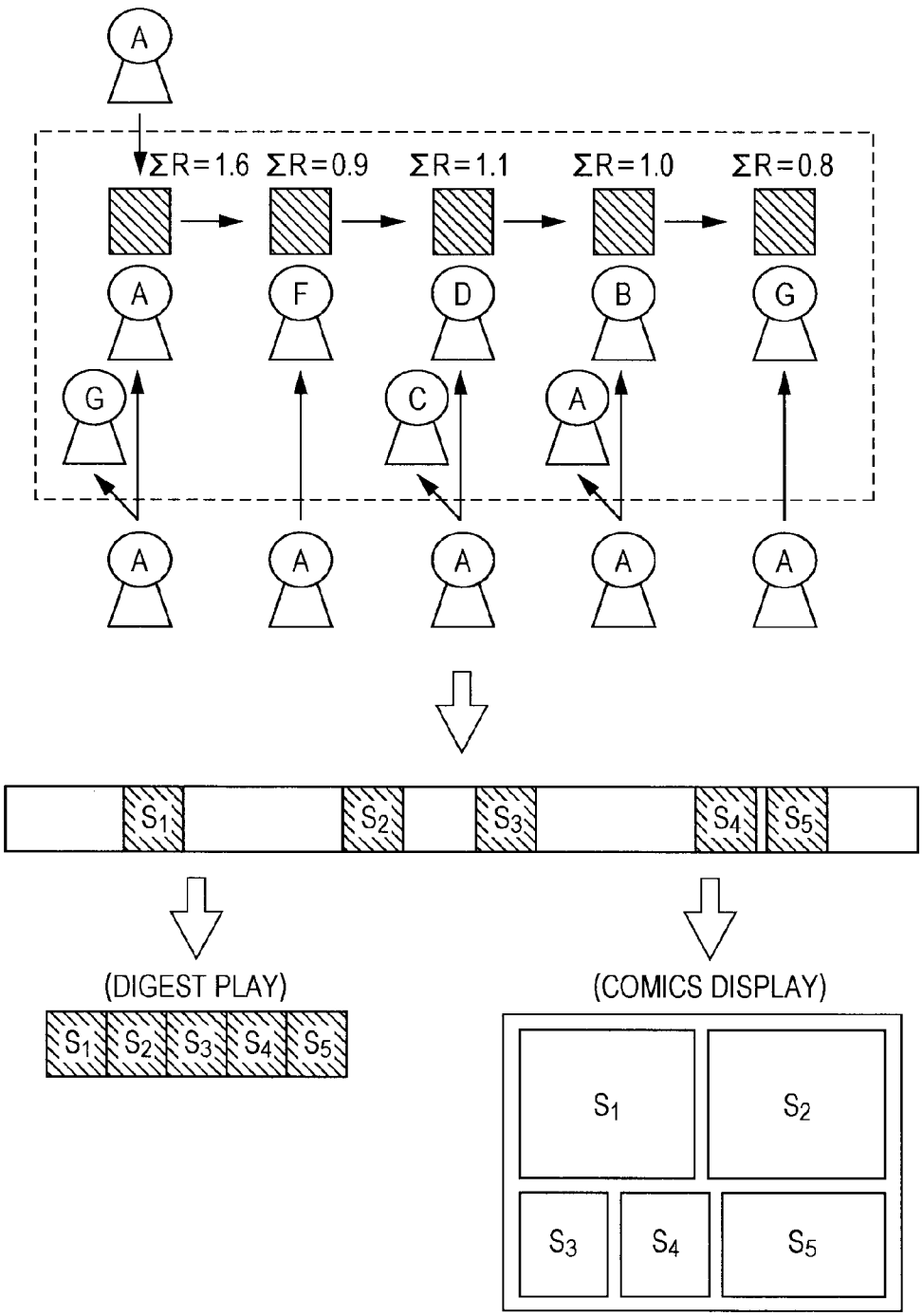
FIG. 24 is an explanatory diagram for describing an operation example of the information processing apparatus according to the present embodiment.
Figure 25:
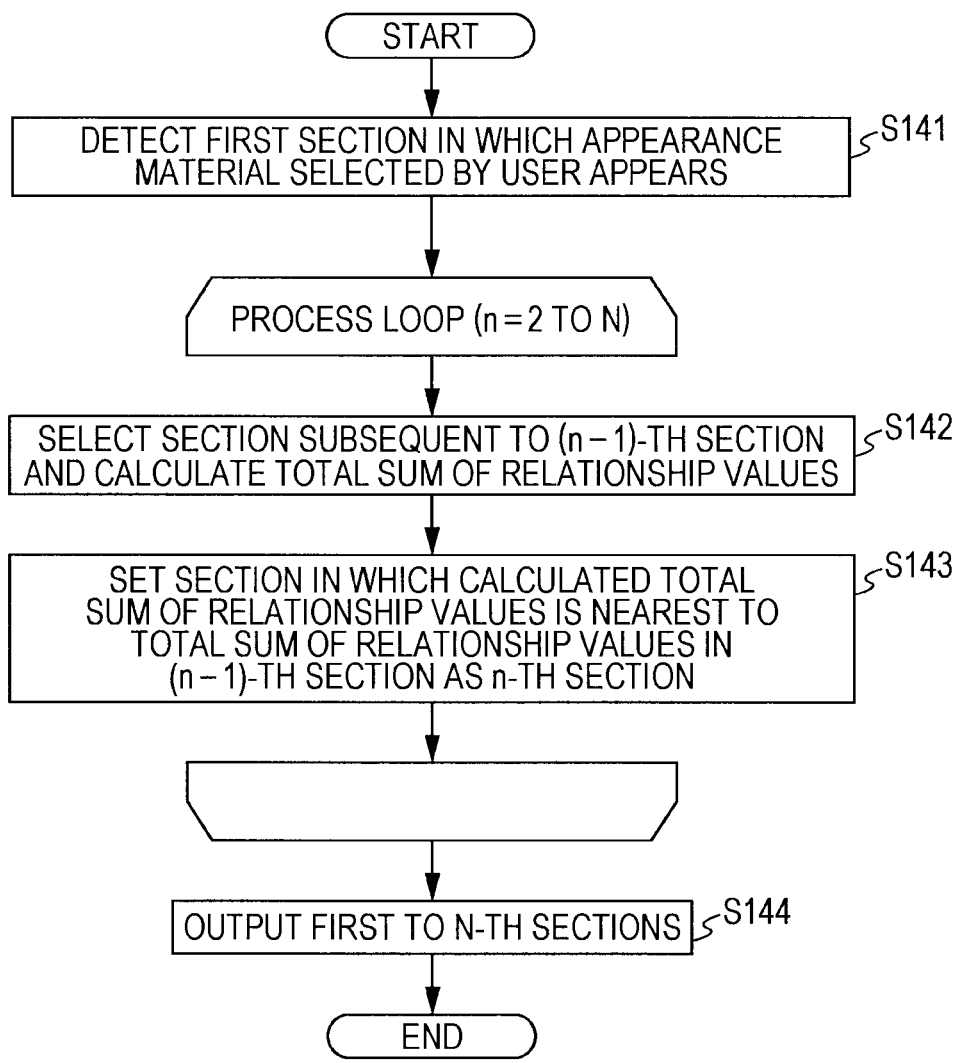
FIG. 25 is an explanatory diagram for describing an operation example of the information processing apparatus according to the present embodiment.

Next, while referring to FIGS. 24 and 25, yet still another example of the abstract process executed in step S104 will be described in more detail. Here, a method of selecting the appearance material so that a difference of the relationship value sums at the time of the scene switching is minimized (hereinafter, which will be referred to as abstract process #4) will be described. FIG. 24 is an explanatory diagram for describing an outline of the abstract process #4. Also, FIG. 25 is an explanatory diagram for describing an operation of the information processing apparatus 100 related to the abstract process #4.

First, a reference is made on FIG. 24. In a case where the appearance material A is selected by the user, the information processing apparatus 100 selects a section $S_1$ in which the appearance material A appears. Then, the information processing apparatus 100 detects all the appearance materials appearing in the selected section $S_1$ and calculates the relationship values between the respective detected appearance materials and the appearance material A. In the example of FIG. 24, the relationship value between the appearance material A and the appearance material A and the relationship value between the appearance material A and the appearance material G are calculated. The information processing apparatus 100 that has calculated the relationship value counts up the total sum of the calculated relationship values. Subsequently, the information processing apparatus 100 selects a section $S_2$ subsequent to the section $S_1$ and calculates the relationship value between the respective appearance materials and the appearance material A with regard to all the appearance materials appearing in the section $S_2$. Then, the information processing apparatus 100 counts up the total sum of the relationship values with regard to the appearance materials appearing in the section $S_2$.

Furthermore, the information processing apparatus 100 calculates a difference between the total sum of the relationship values calculated with regard to the section $S_1$ and the total sum of the relationship values calculated with regard to the section $S_2$. In a case where this difference is not minimized, the information processing apparatus 100 calculates the total sum of the relationship values with regard to the section $S_2$ while the position of the section $S_2$ is changed and calculates a difference between the total sum of the relationship values calculated with regard to the section $S_1$ and the total sum of the relationship values calculated with regard to the section $S_2$. In a case where the difference is minimized, the information processing apparatus 100 confirms the position of the section $S_2$ and searches for a position of a section $S_3$ subsequent to the section $S_2$ through a similar method. After that, the information processing apparatus 100 successively executes a similar processing to confirm positions of a section $S_4$ and a section $S_5$. The information processing apparatus 100 that has confirmed the combinations in this manner plays the moving pictures of the confirmed sections or disposes and displays the images representing the respective sections.

When the technique of the abstract process #4 is applied, the digest play and the comics display can be realized by using the appearance scene of the appearance material having a strong relationship with the appearance material selected by the user. Also, since the difference of the relationship values before and after the scene switching becomes small, a natural scene switching is realized.

Here, while referring to FIG. 25, an operation of the information processing apparatus 100 related to the abstract process #4 will be described in more detail. As illustrated in FIG. 25, first, the information processing apparatus 100 detects a section (first section) in which an appearance material selected by the user appears (S141). Subsequently, the information processing apparatus 100 starts a processing loop related to n=2 to N. First, the information processing apparatus 100 selects a section subsequent to the (n−1)-th section and counts up the total sum of the relationship values between all the appearance materials appearing in the selected section and the appearance material selected by the user (S142). Subsequently, the information processing apparatus 100 detects a section in which the total sum of the relationship values is nearest to the total sum of the relationship values related to the (n−1)-th section among the selected sections and sets the detected section as the n-th section (S143).

After the processes in step S142 and S143 are executed with regard to n=2 to N, the information processing apparatus 100 advances the process to step S144. The information processing apparatus 100 that has advanced the process to step S144 outputs the first to N-th sections as the information on the extracted scenes (S144), and a series of processes related to the abstract process #4 is ended.

In the above, the further example of the abstract process executed in step S104 has been described.

(2-2-6: Abstract Process #5 (Other Configuration))

The abstract process described so far is designed to extract the appearance scene of the appearance material having a strong relationship directly or indirectly with the appearance material selected by the user. However, it is also possible to carry out a condition change in which the section is selected so that the total sum of the relationship values is minimized, for example. Also, in the case of the technique of successively selecting the sections on the basis of the relationship at the time of the scene switching like the abstract processes #2 and #3, the relationship with the appearance material selected by the user may be gradually weakened in some cases. In view of the above, a devise of inserting a section in which the appearance material having a strong direct relationship with the appearance material selected by the user appears at a random timing may be added, for example. Also, a relatively simple algorithm is exemplified in the above-description explanation, but as a method of detecting the optimal combination of the sections, for example, it is conceivable to employ a method of utilizing a local search, a normalizing method, a genetic algorithm, or the like. In this manner, the above-mentioned abstract process may be modified as appropriate.

Figure 26:
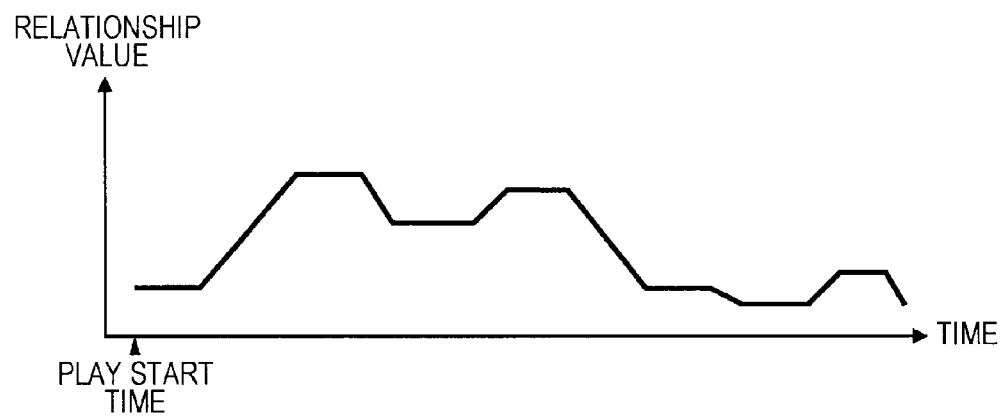
FIG. 26 is an explanatory diagram for describing an operation example of the information processing apparatus according to the present embodiment.
Figure 27:
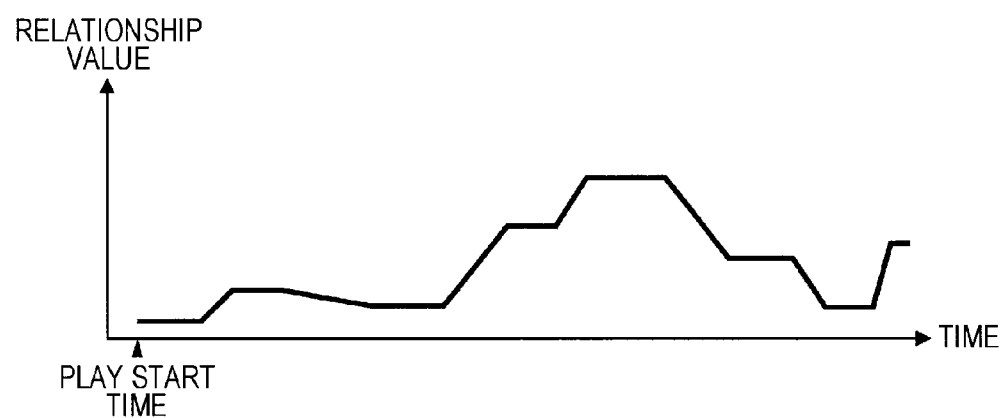
FIG. 27 is an explanatory diagram for describing an operation example of the information processing apparatus according to the present embodiment.

In the above, the operation of the information processing apparatus 100 according to the present embodiment has been described. It should be noted that as illustrated in FIGS. 26 and 27, even when any of the methods is used, the time-series change of the relationship value in the digest moving picture varies in accordance with the appearance material selected by the user. Also, the configuration of the digest moving picture varies in accordance with the appearance material selected by the user. Of course, also in a case where the comics display of the abstract result is carried out, the display content varies in accordance with the appearance material selected by the user.

[2-3: Editing Method for Relationship Value]

Next, while referring to FIGS. 28 to 30, the editing method for the relationship value according to the present embodiment will be described. FIG. 28 is an explanatory diagram illustrating a configuration example of the user interface used for the editing operation on the relationship value. FIG. 29 is an explanatory diagram for describing an editing method for a relationship value. FIG. 30 is an explanatory diagram for describing an operation of the information processing apparatus 100 accompanied by the editing on the relationship value.

(2-3-1: Configuration of Operation UI)

First, while referring to FIGS. 28 and 29, the configuration example of the user interface used for the editing operation on the relationship value will be described.

Figure 28:
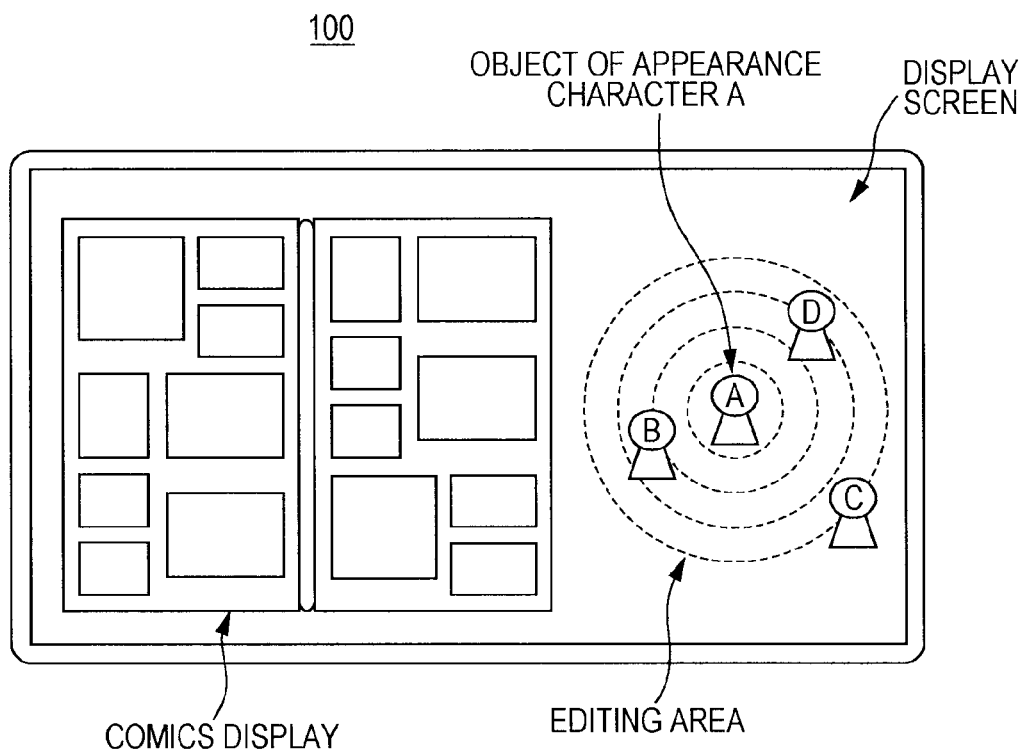
FIG. 28 is an explanatory diagram for describing an editing method for the relationship value according to the present embodiment.

As illustrated in FIG. 28, the information processing apparatus 100 displays an editing area and objects representing the respective appearance materials through a function of the UI display unit 106. This editing area may be displayed on the same display screen as the window for the comics display or the digest play or may be separately displayed on a display screen. In an inside of the editing area, objects of the appearance materials appearing in the moving picture are displayed. Also, in the inside of the editing area, a concentric guide illustrated in FIG. 28 may be displayed. In the example of FIG. 28, the objects of the appearance characters A to D appearing in the moving picture and the concentric guide are displayed.

In the example of FIG. 28, the appearance material selected by the user is the appearance character A. For that reason, the object of the appearance character A is displayed in the center of the editing area. Also, the objects of the appearance characters B to D are arranged on the basis of the relationship values between the respective appearance materials. For example, a distance between the object of the appearance character A and the object of the appearance character B is shorter than a distance between the object of the appearance character A and the object of the appearance character C. This arrangement indicates that the relationship value between the appearance character A and the appearance character B is larger than the relationship value between the appearance character A and the appearance character C. Also, positions for displaying the objects of the appearance characters B to D are decided by also taking into account the relationship value between the appearance character B and the appearance character C, the relationship value between the appearance character C and the appearance character D, and the relationship value between the appearance character B and the appearance character D.

As described above, by arranging the objects of the respective appearance materials appearing in the moving picture on the basis of the relationship values, it is possible to grasp the relationships between the appearance materials at a glance. Also, by displaying the concentric guide in addition, it is possible to accurately grasp the relationships between the appearance material selected by the user and the other appearance materials. It should be noted that the object of the appearance material having the relationship value with the appearance material selected by the user which is below a predetermined threshold may not be display in the editing area. When the above-mentioned display method is applied, an easily viewable display is realized, and it is possible to promptly find the appearance material that is to be paid attention to as the editing target.

Here, the editing operation on the relationship value will be described. In a case where the relationship value is edited, as illustrated in FIG. 29, by changing the position of the object representing the appearance material of the editing target, the user can change the relationship values between the appearance material and the other appearance materials. For example, as illustrated in FIG. 29, when the object of the appearance character B is moved in a lower left direction and the object of the appearance character C is moved in a center direction, the relationship value between the appearance character A and the appearance character B is decreased, and the relationship value between the appearance character A and the appearance character C is increased. Also, in the example of FIG. 29, the relationship value between the appearance character B and the appearance character D is decreased, and the relationship value between the appearance character C and the appearance character D is increased.

(2-3-2: Operation of Information Processing Apparatus 100 Accompanies by Editing Process for Relationship Value)

Figure 29:
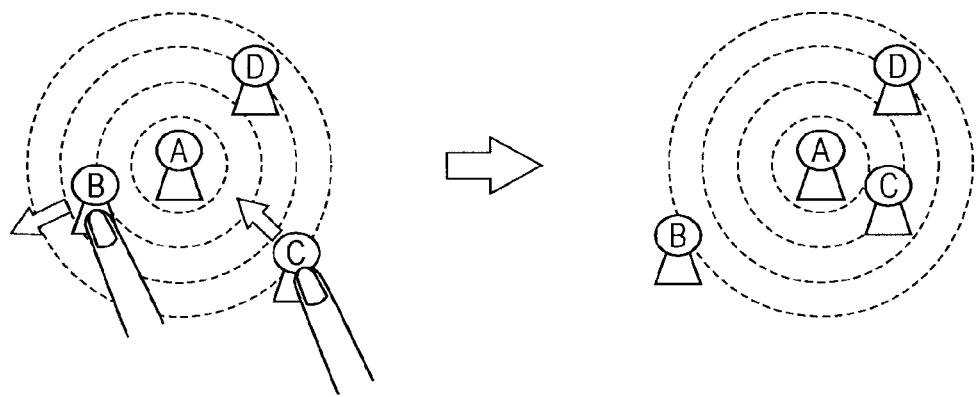
FIG. 29 is an explanatory diagram for describing the editing method for the relationship value according to the present embodiment.

In a case where the editing operation illustrated in FIG. 29 is carried out, the information processing apparatus 100 updates the relationship matrix on the basis of the positional relationship of the objects as illustrated in FIG. 30. For example, in a case where the editing operation exemplified in FIG. 29 is carried out, the information processing apparatus 100 decreases the relationship value between the appearance character A and the appearance character B to a value in accordance with the distance (0.8→0.1) and increases the relationship value between the appearance character A and the appearance character C to a value in accordance with the distance (0.2→0.7). Furthermore, the information processing apparatus 100 increases the relationship value between the appearance character B and the appearance character C to a value in accordance with the distance (0.1→0.3). Then, the information processing apparatus 100 changes the configuration of the digest moving picture or the configuration of the comics display on the basis of the relationship matrix after the update.

In the above, the configuration example of the user interface used for the editing operation on the relationship value and the operation of the information processing apparatus 100 accompanied by the relationship value have been described.

[2-4: Modified Example (Moving Picture Abstract Technique Utilizing Template)]

The moving picture abstract technique utilizing the relationship value has been described so far. Here, in a case where attribution information related to the relationship between the appearance materials is obtained or a case where information such as a camera work and an effect in the respective sections of the moving picture is obtained, a technique of obtaining an abstract result having a story line by using the above-mentioned information will be described. According to this technique, a template illustrated in FIG. 31 is utilized.

(2-4-1: Configuration of Template)

First, while referring to FIG. 31, a configuration of a template will be described. As illustrated in FIG. 31, the template includes attribute information indicating a type of the relationship. Also, the template may include information such as the number of scenes. For example, the template may include such as friend (2 scenes)→stranger (1 scene)→oneself (5 scenes)→enemy (1 scene)→lover (3 scenes). Also, in a case where the information such as the camera work and the effect is obtained as metadata, this metadata is also utilized for the abstract process for the moving picture.

Figure 31:
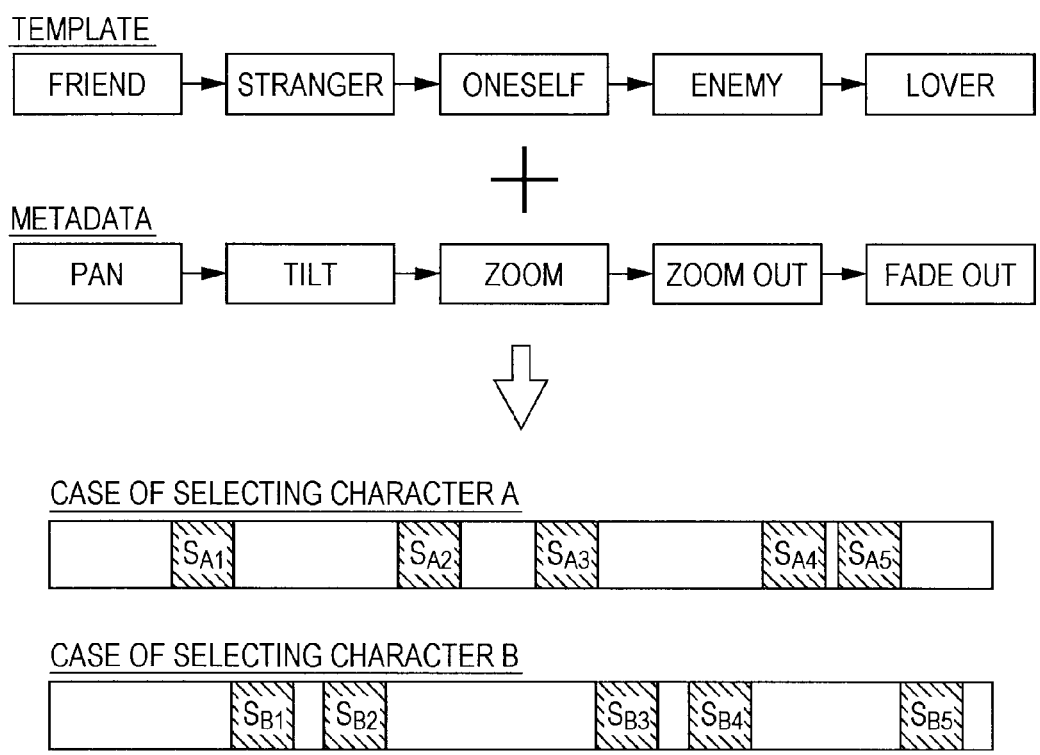
FIG. 31 is an explanatory diagram for describing the moving picture abstract method according to a modified example of the present embodiment.

For example, in the example of FIG. 31, in a case where the appearance character A is selected, the information processing apparatus 100 selects the scene the metadata of which indicates pan among the scenes where the appearance character in the friendship with the appearance character A appears. Subsequently, the information processing apparatus 100 selects the scene the metadata of which indicates tilt among the scenes where the appearance character in the stranger relationship with the appearance character A appears. Subsequently, the information processing apparatus 100 selects the scene the metadata of which indicates zoom among the scenes where the appearance character A appears. Subsequently, the information processing apparatus 100 selects the scene the metadata of which indicates fade out the appearance character in the hostile relationship with the appearance character A appears. Subsequently, the information processing apparatus 100 selects the scene the metadata of which indicates zoom out among the scenes where the appearance character in the lovers' relationship with the appearance character A appears.

In the meantime, in the example of FIG. 31, in a case where the appearance character B is selected, the information processing apparatus 100 selects the scene the metadata of which indicates pan among the scenes where the appearance character in the friendship with the appearance character B appears. Subsequently, the information processing apparatus 100 selects the scene the metadata of which indicates tilt among the scenes where the appearance character in the stranger relationship with the appearance character B appears. Subsequently, the information processing apparatus 100 selects the scene the metadata of which indicates zoom among the scenes where the appearance character B appears. Subsequently, the information processing apparatus 100 selects the scene the metadata of which indicates fade out among the scenes where the appearance character in the hostile relationship with the appearance character B appears. Subsequently, the information processing apparatus 100 selects the scene the metadata of which indicates zoom out among the scenes where the appearance character in the lovers' relationship with the appearance character B appears.

In this manner, by utilizing the template, it is possible to generate the digest moving picture having the story line. Also, similarly as in the moving picture abstract technique utilizing the relationship value, the configuration of the digest moving picture in accordance with the selected appearance material is dynamically changed.

(2-4-2: Flow of Abstract Process)

Figure 32:
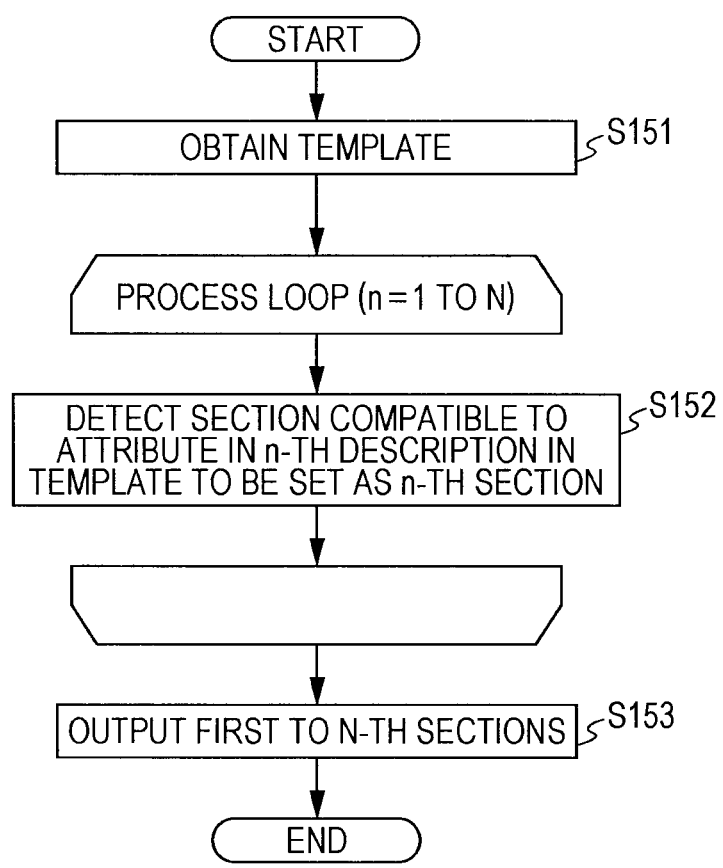
FIG. 32 is an explanatory diagram for describing the moving picture abstract method according to a modified example of the present embodiment.

Here, while referring to FIG. 32, an operation of the information processing apparatus 100 related to the moving picture abstract technique utilizing the template will be described. FIG. 32 is an explanatory diagram for describing an operation of the information processing apparatus 100 related to the moving picture abstract technique utilizing the template.

As illustrated in FIG. 32, first, the information processing apparatus 100 obtains a template (S151). For example, the information processing apparatus 100 obtains the template from the storage apparatus (not illustrated) provided in the casing, the storage apparatus (not illustrated) connected to the network, the service that provides the template, or the like. Subsequently, the information processing apparatus 100 detects a section compatible to the n-th attribution described in the template with regard to n=1 to N to be set as the n-th section (S152). The information processing apparatus 100 that has executed the process in step S152 with regard to n=1 to N advances the process to step S153. The information processing apparatus 100 that has advanced the process to step S153 outputs the first to N-th sections as the information on the extracted scenes (S153), and a series of processes related to the abstract process is ended.

In the above, the operation of the information processing apparatus 100 related to the moving picture abstract technique utilizing the template has been described.

(2-4-3: Template Automatic Generation Method)

The template is obtained from the external unit in the above-mentioned description, but a method of automatically generating the template by utilizing machine learning is also conceivable. In view of the above, while referring to FIG. 33, a template automatic generation method will be simply described.

Figure 33:
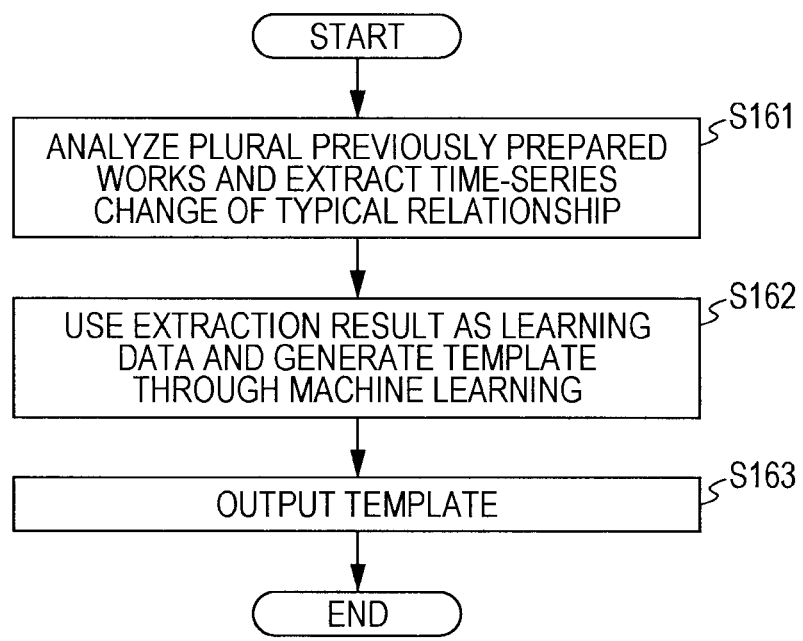
FIG. 33 is an explanatory diagram for describing the moving picture abstract method according to a modified example of the present embodiment.

As illustrated in FIG. 33, first, the information processing apparatus 100 analyzes plural previously prepared works (such as moving pictures and a still image group) and extracts time-series changes of the distinctive relationships in the respective works (S161). Subsequently, the information processing apparatus 100 utilizes the time-series changes of the relationships extracted in step S161 as leaning data and extracts the time-series changes of the distinctive relationships through the machine learning to generate a template (S162). Subsequently, the information processing apparatus 100 outputs the template generated in step S162 (S163), and the automatic generation of a series of processes related to the template is ended. For example, the information processing apparatus 100 stores the template in the storage apparatus provided in the casing (not illustrated) or the storage apparatus (not illustrated) connected to the network or provides the template to a service that provides the template or the like.

In the above, the template automatic generation method has been described.

3: HARDWARE CONFIGURATION EXAMPLE

Figure 34:
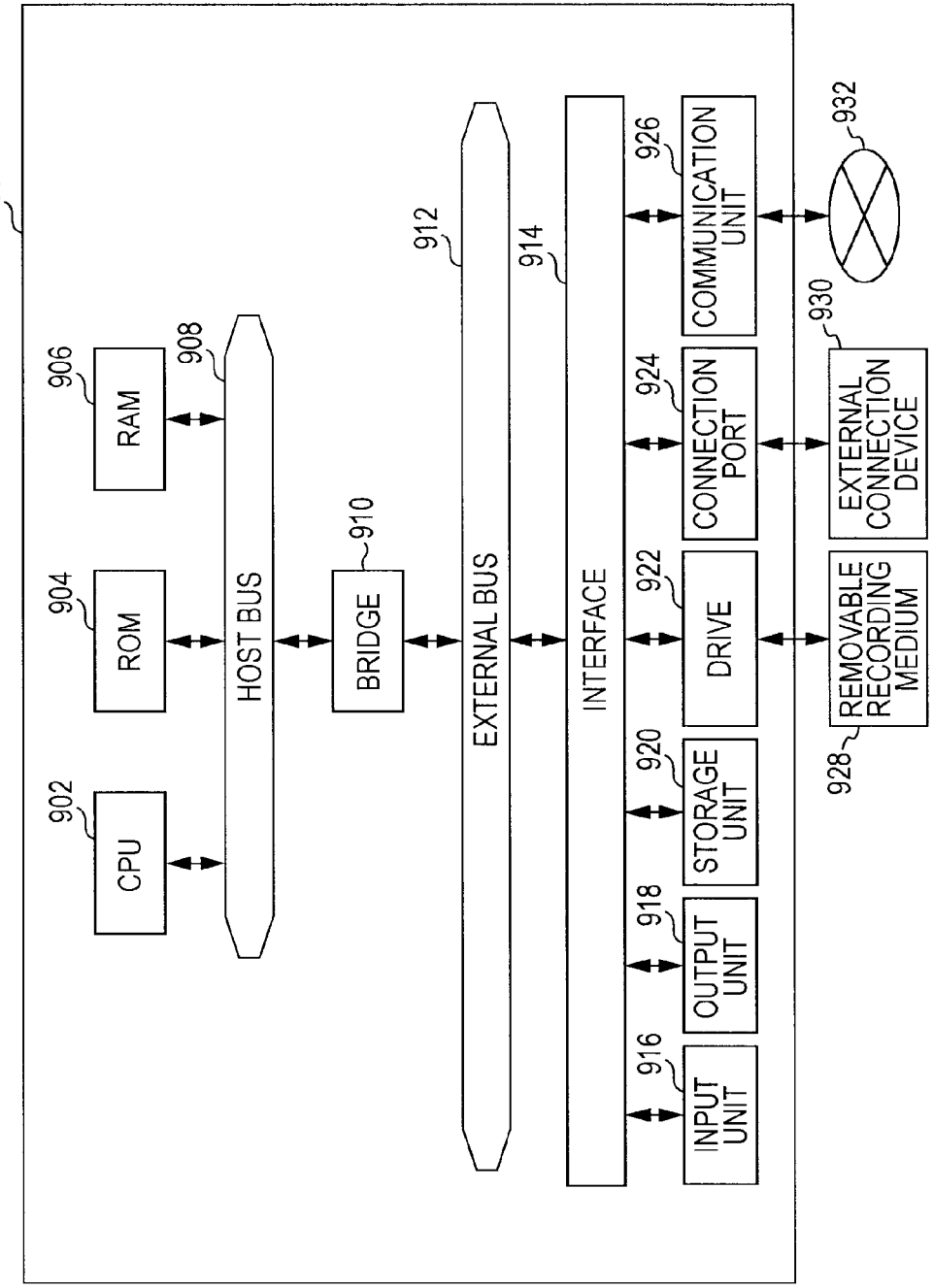
FIG. 34 is an explanatory diagram for describing a hardware configuration example with which a function of the information processing apparatus according to the present embodiment can be realized.

Functions of the respective components included in the information processing apparatus 100 can be realized, for example, by using a hardware configuration illustrated in FIG. 34. In other words, the relevant functions of the respective components are realized by controlling the hardware illustrated in FIG. 34 by using a computer program. It should be noted that a mode of this hardware is arbitrary and includes, for example, a personal computer, a mobile phone, a PHS, a mobile information terminal such as PDA, a game machine, or various home information appliances such as a remote control for a television. The PHS stands for Personal Handy-phone System. The PDA stands for Personal Digital Assistant.

In the examples of a table computer and a remote control, either device can be used as the user interface to receive the user's instruction (via input unit 916) to change the spatial relationship between respective appearance materials such as persons in a video, or people in a portfolio of images display on a television or other remote display device. Moreover, the input unit 916 may be a touch panel display or a proximity display.

As illustrated in FIG. 34, this hardware mainly includes a CPU 902, a ROM 904, a RAM 906, a host bus 908, and a bridge 910. Furthermore, this hardware also includes an external bus 912, an interface 914, an input unit 916, an output unit 918, a storage unit 920, a drive 922, a connection port 924, and a communication unit 926. The CPU stands for Central Processing Unit. The ROM stands for Read Only Memory. The RAM stands for Random Access Memory.

The CPU 902 functions, for example, as an arithmetic processing unit or a control unit and controls entire or partial operations of the respective components on the basis of various programs recorded on the ROM 904, the RAM 906, the storage unit 920, or a removable recording medium 928. The ROM 904 is a unit that stores a program read into the CPU 902, data used for an arithmetic processing, and the like. The RAM 906 temporarily or permanently stores, for example, the program read into the CPU 902, various parameters that appropriately change when the program is executed, and the like.

The components are mutually connected, for example, via the host bus 908 that can carry out a high speed data transmission. On the other hand, the host bus 908 is connected, for example, to the external bus 912 a data transmission speed of which is relatively slow via the bridge 910. Also, for the input unit 916, for example, a mouse, a key board, a touch panel, a button, a switch, a lever, and the like are used. Furthermore, for the input unit 916, a remote controller that can transmit a control signal by utilizing infrared rays or other radio waves may be used in some cases.

The output unit 918 includes, for example, an apparatus that can visually or aurally notifies a user of the obtained information such as a display apparatus including a CRT, an LCD, a PDP, or an ELD, an audio output apparatus such as a speaker or a headphone, a printer, a mobile phone, or a facsimile. The CRT stands for Cathode Ray Tube. The LCD stands for Liquid Crystal Display. The PDP stands for Plasma Display Panel. The ELD stands for Electro-Luminescence Display.

The storage unit 920 is an apparatus that stores various pieces of data. For the storage unit 920, for example, a magnetic storage device such as a hard disc drive (HDD), a semiconductor storage device, an optical storage device, an opto-magnetic storage device, or the like is used. The HDD stands for Hard Disk Drive.

The drive 922 is, for example, an apparatus that reads out information recorded on the removable recording medium 928 such as the magnetic storage, the optical storage device, the opto-magnetic storage device, or a semiconductor memory or writes the information to the removable recording medium 928. The removable recording medium 928 includes, for example, DVD media, Blu-ray media, HD DVD media, various semiconductor storage media, and the like. Of course, the removable recording medium 928 may be, for example, an IC card on which a non-contact type IC chip is mounted, an electronic device, or the like. The IC stands for integrated Circuit.

The connection port 924 is, for example, a port that connects an external connection device 930 such as a USB port, an IEEE1394 port, SCSI, an RS-232C port, or an optical audio terminal. The external connection device 930 is, for example, a printer, a portable music player, a digital camera, a digital video camera, an IC recorder, or the like. The USB stands for Universal Serial Bus. The SCSI stands for Small Computer System Interface.

The communication unit 926 is a communication device that establishes a connection to a network 932 and is, for example, a wired or wireless LAN, Bluetooth (registered trademark), a communication card for WUSB, a router for an optical communication, a router for ADSL, modems for various communications, or the like. Also, the network 932 to which the communication unit 926 is connected is composed of a network connected with or without a wire and is, for example, the internet, a household LAN, an infrared communication, a visible light communication, broadcasting, a satellite communication, or the like. The LAN stands for Local Area Network. The WUSB stands for Wireless USB. The ADSL stands for Asymmetric Digital Subscriber Line.

4: CLOSING

Lastly, the technological idea of the present embodiment is simply summarized. The technological idea described below can be applied to various information processing apparatuses such as, for example, a PC, a movie phone, a game machine, an information terminal, an home information appliance, and a car navigation system.

The functional configuration of the above-mentioned information processing apparatus can be represented as follows. For example, an information processing apparatus according to (1) described below has a function of detecting a section in which the appearance material having a relationship with the appearance material selected by the user appears from the moving picture on the basis of the relationship information and the section metadata and outputting an image corresponding to the section. In other words, this information processing apparatus can output a digest movie by joining scenes in which the appearance material related to the appearance material selected by the user appears or realize an overview display of the digest scenes by disposing the images corresponding to the extracted scenes. Of course, if the appearance material selected by the user is changed, these configurations of the digest movie and the overview display are also automatically changed to configurations suitable to the relevant appearance material.

As described above, when the moving picture abstract technique according to the present embodiment is used, by only selecting an appearance material such as a character or an article, the contents of the digest movie or the overview display related to the relevant appearance material can be automatically generated. For example, when a moving picture recoding a situation of an athletic festival is prepared and its own child is selected, a digest movie related to its own child is automatically generated. In this digest movie, not only its own child but also characters related to its own child such as friends and teachers appear, and it becomes also possible to grasp an atmosphere of a school life with a central focus on a personal relationship from the digest movie. Also, when a moving picture recoding an event such as a wedding ceremony is prepared and bride and groom are selected, an edited digest movie with a central focus on the bride and groom where friends, close relatives, and the like appear is automatically generated.

In this manner, when the information processing apparatus described below having the configuration with which the moving picture abstract technique according to the present embodiment can be realized is used, it becomes possible to easily generate the digest movie that takes into account the personal relationship without a help from a specialist. Of course, instead of the digest movie, it is possible to realize the overview display or the like in which the images corresponding to the respect scenes are disposed and displayed. Also, the moving picture abstract technique according to the present embodiment can similarly deal with not only the relationship between the characters but also the relationship between the character and the article or the relationship between the article and the article. For example, when a moving picture recording a film is prepared and appearing sunglasses are selected, it is also possible to generate a digest movie or the like where appearance scenes of an actor having a relationship with the sunglasses are summarized. The above-mentioned digest movie may be utilized, for example, as a commercial movie for the sunglasses. In this manner, the moving picture abstract technique according to the present embodiment has a wide application range and can be utilized in various situations.

According to the above teachings, an apparatus embodiment of an image processing device according to the present disclosure includes a user interface display control unit that causes respective appearance materials in an image portfolio to be displayed on a display, the respective appearance materials being displayed in a spatial relationship, the user interface display control unit configured to change respective relationship values between the respective appearance materials in response to a change in the spatial relationship received as input to the user interface display control unit.

According to one aspect of the embodiment the device further includes the display.

According to another aspect of the embodiment, the display being an interactive display that is at least one of a touch screen display and a proximity display.

According to another aspect of the embodiment, the display displays a scene from the image portfolio; and in response to the change in spatial relationship received as input, the user interface display control unit changes the scene to another scene.

According to another aspect of the embodiment, the image portfolio includes photographs.

According to another aspect of the embodiment, the image portfolio includes video frames.

According to another aspect of the embodiment, the device further includes an input device; and a communication unit, wherein the display is remotely located from the image processing device and the communication unit generates a control signal sent wirelessly via the communication unit to a remote device that controls content that is displayed on the display.

According to another aspect of the embodiment, the device further includes a housing that includes the user interface control unit, the input device, and the communication unit, wherein the housing being a housing for one of a tablet computer and a remote controller.

According to another aspect of the embodiment, the spatial relationship data and the appearance materials are simultaneously displayed on the display.

According to another aspect of the embodiment, the device further includes a relationship information generation unit that calculates relationship values between the respective appearance materials and a particular appearance material and selects a predetermined number of appearance materials in descending relationship value order.

According to another aspect of the embodiment, the device further includes a relationship information generation unit that calculates relationship values between pairs of appearance materials and orders the pairs of appearance materials in descending relationship value order.

According to another aspect of the embodiment, the device further includes a relationship information generation unit that calculates relationship values between all appearance materials occurring in respective video scenes and orders appearance materials in descending relationship value order.

According to another aspect of the embodiment, the device further includes a relationship information generation unit that calculates relationship values between a predetermined appearance material and all detected appearance materials in respective video scenes and orders appearance materials in descending relationship value order.

According to an image processing method embodiment, the method includes displaying with a user interface display control unit respective appearance materials in an image portfolio, the displaying including displaying on a display respective appearance materials in a spatial relationship, receiving a change in the spatial relationship input to the user interface display control unit; and changing respective relationship values between the respective appearance materials in response to the receiving.

According to an aspect of the embodiment, the displaying includes displaying a scene from the image portfolio; and in response to the changing in spatial relationship received as input, changing to another displayed scene.

According to another aspect of the embodiment, the method further includes calculating with a relationship information generation unit relationship values between the respective appearance materials and a particular appearance material; and selecting a predetermined number of appearance materials in descending relationship value order.

According to another aspect of the embodiment, the method further includes calculating relationship values between pairs of appearance materials and ordering predetermined pairs of appearance materials in descending relationship value order.

According to another aspect of the embodiment, the method further includes calculating relationship values between all appearance materials occurring in respective scenes; and ordering appearance materials in descending relationship value order.

According to another aspect of the embodiment, the method further includes calculating relationship values between a predetermined appearance material and all detected appearance materials in a scene; and ordering appearance materials in descending relationship value order.

According to a non-transitory computer storage medium embodiment, the storage medium includes computer readable instructions that when executed by a processing circuit performs an image processing method that includes displaying with a user interface display control unit respective appearance materials in an image portfolio, the displaying including displaying on a display respective appearance materials in a spatial relationship, receiving a change in the spatial relationship input to the user interface display control unit; and changing respective relationship values between the respective appearance materials in response to the receiving.

What is claimed is:

1. An image processing device comprising:

a user interface display control unit that causes respective appearance materials in an image portfolio to be displayed on a display, said respective appearance materials being displayed in a spatial relationship, said user interface display control unit configured to change respective relationship values between the respective appearance materials in response to a change in the spatial relationship received as input to the user interface display control unit, wherein the change in the spatial relationship between a first appearance material and a second appearance material in a two-dimensional space is input as a user-actuated touch and drag operation of the first appearance material toward or away from the second appearance material;

the display, wherein the display displays a scene from the image portfolio, in response to the change in spatial relationship received as input, the user interface display control unit changes the scene to another scene; and a relationship information unit that calculates relationship values between appearance materials and orders that appearance materials in a pre-determined order.

2. The image processing device of claim 1, wherein the display being an interactive display that is at least one of a touch screen display and a proximity display.

3. The image processing device of claim 1, wherein the image portfolio includes photographs.

4. The image processing device of claim 1, wherein the image portfolio includes video frames.

5. The image processing device of claim 1, further comprising:
an input device; and
a communication unit, wherein
said display is remotely located from said image processing device and said communication unit generates a control signal sent wirelessly via the communication unit to a remote device that controls content that is displayed on the display.

6. The image processing device of claim 5, further comprising:
a housing that includes said user interface control unit, said input device, and said communication unit, wherein
said housing being a housing for one of a tablet computer and a remote controller.

7. The image processing device of claim 1, wherein said spatial relationship data and said appearance materials are simultaneously displayed on the display.

8. The image processing device of claim 1 wherein:
the relationship information generation unit calculates relationship values between the respective appearance materials and a particular appearance material and selects a predetermined number of appearance materials in descending relationship value order.

9. The image processing device of claim 1 wherein:
the relationship information generation unit calculates relationship values between pairs of appearance materials and orders the pairs of appearance materials in descending relationship value order.

10. The image processing device of claim 1, wherein:
a relationship information generation unit calculates relationship values between all appearance materials occurring in respective video scenes and orders appearance materials in descending relationship value order.

11. The image processing device of claim 1, wherein:
a relationship information generation unit calculates relationship values between a predetermined appearance material and all detected appearance materials in respective video scenes and orders appearance materials in descending relationship value order.

12. An image processing method comprising:
displaying with a user interface display control unit respective appearance materials in an image portfolio, said displaying including
displaying on a display respective appearance materials in a spatial relationship,
receiving a change in the spatial relationship input to the user interface display control unit including touching and dragging a first appearance material toward or away from a second appearance material in a two-dimensional space on the display;
changing respective relationship values between the respective appearance materials in response to the receiving, wherein the displaying includes displaying a scene from the image portfolio, and in response to the changing in spatial relationship received as input, changing to another displayed scene, and
calculating relationship values between appearance materials and ordering the appearance materials in a pre-determined order.

13. The method of claim 12, further comprising:
calculating relationship values between the respective appearance materials and a particular appearance material; and
selecting a predetermined number of appearance materials in descending relationship value order.

14. The method of claim 12, further comprising:
calculating relationship values between pairs of appearance materials and ordering predetermined pairs of appearance materials in descending relationship value order.

15. The method of claim 12, further comprising:
ordering appearance materials in descending relationship value order.

16. The method of claim 12, further comprising:
calculating relationship values between a predetermined appearance material and all detected appearance materials in a scene; and
ordering appearance materials in descending relationship value order.

17. A non-transitory computer storage medium that includes computer readable instructions that when executed by a processing circuit performs an image processing method comprising:
displaying with a user interface display control unit respective appearance materials in an image portfolio, said displaying including
displaying on a display respective appearance materials in a spatial relationship,
receiving a change in the spatial relationship input to the user interface display control unit including touching and dragging a first appearance material toward or away from a second appearance material in a two-dimensional space on the display;
changing respective relationship values between the respective appearance materials in response to the receiving, wherein the displaying includes displaying a scene from the image portfolio, and in response to the changing in spatial relationship received as input, changing to another displayed scene, and
calculating relationship values between appearance materials and ordering the appearance materials in a pre-determined order.

* * * * *